United States Patent
Lin et al.

(10) Patent No.: US 10,887,063 B2
(45) Date of Patent: Jan. 5, 2021

(54) NARROWBAND POSITIONING REFERENCE SIGNAL

(71) Applicant: Telefonaktiebolaget LM Ericsson (publ), Stockholm (SE)

(72) Inventors: Xingqin Lin, Santa Clara, CA (US); Johan Bergman, Stockholm (SE); Fredrik Gunnarsson, Linköping (SE); Olof Liberg, Stockholm (SE); Sara Modarres Razavi, Linköping (SE); Henrik Rydén, Solna (SE); Yutao Sui, Solna (SE); Yi-Pin Eric Wang, Fremont, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/336,223

(22) PCT Filed: Sep. 29, 2017

(86) PCT No.: PCT/SE2017/050954
§ 371 (c)(1),
(2) Date: Mar. 25, 2019

(87) PCT Pub. No.: WO2018/063078
PCT Pub. Date: Apr. 5, 2018

(65) Prior Publication Data
US 2019/0215121 A1    Jul. 11, 2019

Related U.S. Application Data

(60) Provisional application No. 62/402,741, filed on Sep. 30, 2016.

(51) Int. Cl.
*H04L 5/00* (2006.01)
*H04W 72/04* (2009.01)
*H04L 29/08* (2006.01)

(52) U.S. Cl.
CPC .......... *H04L 5/0048* (2013.01); *H04L 5/005* (2013.01); *H04L 5/0007* (2013.01); *H04W 72/0453* (2013.01); *H04L 67/12* (2013.01)

(58) Field of Classification Search
CPC ........................................ H05L 5/00
See application file for complete search history.

(56) References Cited

U.S. PATENT DOCUMENTS

2019/0254013 A1* 8/2019 Chang ............... H04L 67/12

OTHER PUBLICATIONS

Vodafone, et al., "New work item proposal: Enhancements of NB-IoT", 3GPP TSG RAN Meeting #72, Busan, Korea, Jun. 13, 2016, pp. 1-8, RP-161324, 3GPP.
(Continued)

*Primary Examiner* — Sulaiman Nooristany
(74) *Attorney, Agent, or Firm* — Coats & Bennett, PLLC

(57) ABSTRACT

A user equipment (16) is configured for operation in a narrowband wireless communication system (10). The user equipment (16) is configured to detect receipt of a narrowband positioning reference signal (20) that comprises a narrowband reference signal sequence. The narrowband reference signal sequence is a subsequence of a wideband reference signal sequence. The wideband reference signal sequence is configured for a wideband frequency bandwidth that is wider than a maximum frequency bandwidth defined for the narrowband wireless communication system (10). The user equipment (16) is also configured to perform a positioning measurement using the narrowband positioning reference signal (20).

10 Claims, 17 Drawing Sheets

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Physical channels and modulation (Release 13)", Technical Specification, 3GPP TS 36.211 V13.2.0, Jun. 1, 2016, pp. 1-168, 3GPP.

Huawei, et al. "Revised work item proposal: Enhancements of NB-IoT", 3GPP TSG RAN Meeting #73, New Orleans, USA, Sep. 19, 2016, pp. 1-8, RP-161901, 3GPP.

3rd Generation Partnership Project, "3rd Generation Partnership Project; Technical Specification Group Radio Access Network; Evolved Universal Terrestrial Radio Access (E-UTRA); Services provided by the physical layer (Release 13)", Technical Specification, 3GPP TS 36.302 V13.2.0, Jun. 1, 2016, pp. 1-28, 3GPP.

Ericsson, "Revised WID for Further Enhanced MTC for LTE", 3GPP TSG RAN Meeting #73, New Orleans, USA, Sep. 19, 2016, pp. 1-6, RP-161464, 3GPP.

3rd Generation Partnership Project, "3rd Generation Partnership Project; Technical Specification Group Radio Access Network; Evolved Universal Terrestrial Radio Access (E-UTRA); User Equipment (UE) radio access capabilities (Release 13)", Technical Specification, 3GPP TS 36.306 V13.2.0, Jun. 1, 2016, pp. 1-61, 3GPP.

ITL, "Support of OTDOA in MB-IoT", 3GPP TSG RAN WG1 Meeting #86, Gothenburg, Sweden, Aug. 22, 2016, pp. 1-9, R1-167752, 3GPP.

Institute for Information Industry (III), "Discussion on OTDOA for eNB-IoT", 3GPP TSG RAN WG1 Meeting #86, Gothenburg, Sweden, Aug. 22, 2016 pp. 1-2, R1-167740, 3GPP.

Ericsson, "Text Proposal and Discussion on Further Enhancements for OTDOA", 3GPP TSG RAN WG1 Meeting #182, Beijing, China, Aug. 24, 2015, pp. 1-9, R1-153744, 3GPP.

Fischer, S., "Observed Time Difference of Arrival (OTDOA) positioning in 3GPP LTE", Jun. 6, 2014, pp. 1-62, Qualcomm Technologies, Inc.

Ericsson, "OTDOA performance for NB-IoT", 3GPP TSG-RAN1 Meeting #86bis, Lisbon, Portugal, Oct. 10, 2016, pp. 1-4, R-1608698, 3GPP.

Ericsson, "A new system simulator for NB-IoT positioning", 3GPP TSG-RAN1#86bis, Gothenburg, Sweden, Oct. 10, 2016, pp. 1-13, R1-1608699, 3GPP.

Ericsson, "On the use of existing NB-IoT signals for OTDOA", 3GPP TSG-RAN1#86bis, Oct. 10, 2016, Lisbon, Portugal, pp. 1-5, R1-1610346, 3GPP.

\* cited by examiner

NARROWBAND POSITIONING REFERENCE SIGNAL

RELATED APPLICATIONS

This application claims priority to U.S. Provisional Patent Application Ser. No. 62/402,741 filed Sep. 30, 2016, the entire contents of which are incorporated herein by reference.

TECHNICAL FIELD

The present application relates generally to a wireless communication system and particularly to a narrowband positioning reference signal in a narrowband wireless communication system.

BACKGROUND

The Internet of Things (IoT) is a vision for the future world where everything that can benefit from a connection will be connected. Cellular technologies are being developed or evolved to play an indispensable role in the IoT world, particularly the machine type communication (MTC). MTC is characterized by lower demands on data rates than for example mobile broadband, but with higher requirements on e.g. low cost device design, better coverage, and ability to operate for years on batteries without charging or replacing the batteries. To meet the IoT design objectives, 3GPP has standardized Narrowband IoT (NB-IoT) in Release 13 that has a system bandwidth of 180 kHz and targets improved coverage, long battery life, low complexity communication design, and network capacity that is sufficient for supporting a massive number of devices.

To further increase the market impact of NB-IoT, improving narrowband support for positioning has been agreed to be a key aspect of NB-IoT in Release 14. The enhancement will be designed to maintain the ultra-low cost and complexity of the Rel-13 NB-IoT UE where appropriate, as well as the coverage and capacity of the NB-IoT network. Realizing acceptable positioning performance however proves complicated given the constraints of NB-IoT, e.g., as compared to Long Term Evolution (LTE).

SUMMARY

Embodiments herein provide positioning using a narrowband positioning reference signal. The narrowband positioning reference signal is designed in some embodiments so as to advantageously provide strong hearability in a narrowband wireless communication system such as NB-IoT. The signal may also be designed in some embodiments to provide full inheritance of a wideband reference signal design (e.g., LTE positioning reference signal design), reducing design risks, minimizing testing efforts, and offering synergies.

More particularly, some embodiments herein include a method performed by a user equipment configured for operation in a narrowband wireless communication system (e.g., NB-IoT or FeMTC). The method comprises detecting receipt of a narrowband positioning reference signal that comprises a narrowband reference signal sequence. The narrowband reference signal sequence is a subsequence of a wideband reference signal sequence. The wideband reference signal sequence is configured for a wideband frequency bandwidth (e.g., a maximum possible LTE bandwidth) that is wider than a maximum frequency bandwidth defined for the narrowband wireless communication system. The method further comprises performing a positioning measurement (e.g., RSTD or OTDOA) using the narrowband positioning reference signal.

Embodiments herein also include a method performed by a radio network node (e.g., a base station) configured for operation in a narrowband wireless communication system. The method comprises generating a narrowband positioning reference signal that comprises a narrowband reference signal sequence. The narrowband reference signal sequence is a subsequence of a wideband reference signal sequence. The wideband reference signal sequence is configured for a wideband frequency bandwidth (e.g., a maximum possible LTE bandwidth) that is wider than a maximum frequency bandwidth defined for the narrowband wireless communication system. The method also comprises transmitting the narrowband positioning reference signal to a wireless communication device, e.g., for performance of a positioning measurement.

Embodiments herein further include a method performed by a network node (e.g., base station or positioning server) configured for operation in a narrowband wireless communication system. The method comprises generating configuration information for configuring a radio network node to transmit and/or a wireless communication device to detect a narrowband positioning reference signal that comprises a narrowband reference signal sequence. The narrowband reference signal sequence is a subsequence of a wideband reference signal sequence. The wideband reference signal sequence is configured for a wideband frequency bandwidth (e.g., a maximum possible LTE bandwidth) that is wider than a maximum frequency bandwidth defined for the narrowband wireless communication system. The method further comprises transmitting the configuring information to the radio network node and/or the wireless communication device, e.g., as part of configuring performance of a positioning measurement using the narrowband positioning reference signal.

In any of these embodiments, the narrowband reference signal sequence may be mapped to radio resources within a narrowband frequency bandwidth comprising $N_{RB}^{NPRS}$ resource blocks, with $E_{NB}$ elements from the narrowband reference signal sequence mapped to $E_{NB}$ radio resources within each resource block. In some embodiments, the wideband reference signal sequence includes more than $E_{NB} \cdot N_{RB}^{max,NB}$ elements, where $N_{RB}^{max,NB} \geq N_{RB}^{NPRS}$ comprises a number of resource blocks that span the maximum frequency bandwidth defined for the narrowband wireless communication system. In one embodiment, for example, $N_{RB}^{max,NB} = N_{RB}^{NPRS} = 1$ and $E_{NB} = 2$.

Alternatively or additionally, the narrowband reference signal sequence in some embodiments is mapped to frequency resources within a symbol l and time slot $n_s$, and is a subsequence of the wideband reference signal sequence $r_{l,n_s}(m)$ defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

where $n_s$ is a slot number within a radio frame, l is a symbol number within the slot, c(i) is a pseudo-random sequence, and $N_{RB}^{max,DL}$ is a number of resource blocks within the wideband frequency bandwidth for which the wideband reference signal sequence is configured. In some embodiments, the pseudo-random sequence c(i) is initialized with a cell identity $N_{ID}^{Ncell}$ of a cell of the narrowband wireless communication system in which the narrowband positioning reference signal is transmitted. Alternatively or additionally, the narrowband reference signal sequence in some embodiments is a sequence $r_{l,n_s}(m)$ that includes 2 elements, where m'=m+$N_{RB}^{max,DL}$-1, for m=0, 1, and where the narrowband positioning reference signal is transmitted within a narrowband frequency bandwidth comprising 1 resource block.

In any of these embodiments, the narrowband reference signal sequence may comprise 2·$N_{RB}^{NPRS}$ elements at a center of the wideband reference signal sequence, and the narrowband positioning reference signal may be transmitted within a narrowband frequency bandwidth comprising $N_{RB}^{NPRS}$ resource blocks. Alternatively or additionally, the narrowband reference signal sequence may be a subsequence at a position within the wideband reference signal sequence that depends on a relative position of the narrowband wireless communication system within a system bandwidth of a wideband wireless communication system for which the wideband reference signal is configured.

In some embodiments, configuration information transmitted from a network node indicates that the narrowband reference signal sequence is a particular one of different possible subsequences of the wideband reference signal sequence.

In some embodiments, the narrowband reference signal sequence is mapped onto radio resources in each symbol interval of a time slot.

In any of these embodiments, one or more narrowband positioning reference signals may be transmitted within a positioning occasion that comprises a defined number of consecutive subframes, wherein the defined number is more than 6.

In some embodiments, one or more narrowband positioning reference signals are transmitted within a positioning occasion that comprises a defined number of consecutive subframes. In this case, the narrowband positioning reference signal may be transmitted in each of the consecutive subframes within a positioning occasion, except for any subframes defined as invalid narrowband positioning reference signal subframes. Which subframes are defined as invalid narrowband positioning reference signal subframes is configurable by the narrowband wireless communication system, and configuration information identifying which if any subframes are defined as invalid narrowband positioning reference signal subframes is signaled from a network node to the user equipment.

In any of these embodiments, the narrowband wireless communication system may be a narrowband internet of things (NB-IoT) system. For example, one or more embodiments herein include a new narrowband positioning reference signal (NPRS) design for OTDOA in NB-IoT. The NPRS design may advantageously exploit certain aspects of legacy PRS design. The NPRS design may include certain modifications tailored to NB-IoT. One or more aspects include: (i) how NPRS sequence is truncated from a long pseudo-random QPSK sequence; (ii) how NPRS symbols are mapped to resource elements; and/or (iii) explicit multi-antenna transmission scheme for NPRS That said, though some parts of the description are centered on NB-IOT, many designs apply to FeMTC and other systems as well.

Embodiments also include corresponding apparatus, computer programs, and carriers.

For example, embodiments include a user equipment configured for operation in a narrowband wireless communication system. The user equipment is configured to detect receipt of a narrowband positioning reference signal that comprises a narrowband reference signal sequence. The narrowband reference signal sequence is a subsequence of a wideband reference signal sequence. The wideband reference signal sequence is configured for a wideband frequency bandwidth (e.g., a maximum possible LTE bandwidth) that is wider than a maximum frequency bandwidth defined for the narrowband wireless communication system. The user equipment is also configured to perform a positioning measurement (e.g., RSTD or OTDOA) using the narrowband positioning reference signal.

Embodiments further include a radio network node (e.g., a base station) configured for operation in a narrowband wireless communication system. The radio network node is configured to generate a narrowband positioning reference signal that comprises a narrowband reference signal sequence. The narrowband reference signal sequence is a subsequence of a wideband reference signal sequence. The wideband reference signal sequence is configured for a wideband frequency bandwidth (e.g., a maximum possible LTE bandwidth) that is wider than a maximum frequency bandwidth defined for the narrowband wireless communication system. The radio network node is also configured to transmit the narrowband positioning reference signal to a wireless communication device, e.g., for performance of a positioning measurement.

DETAILED DESCRIPTION

Figure 1:
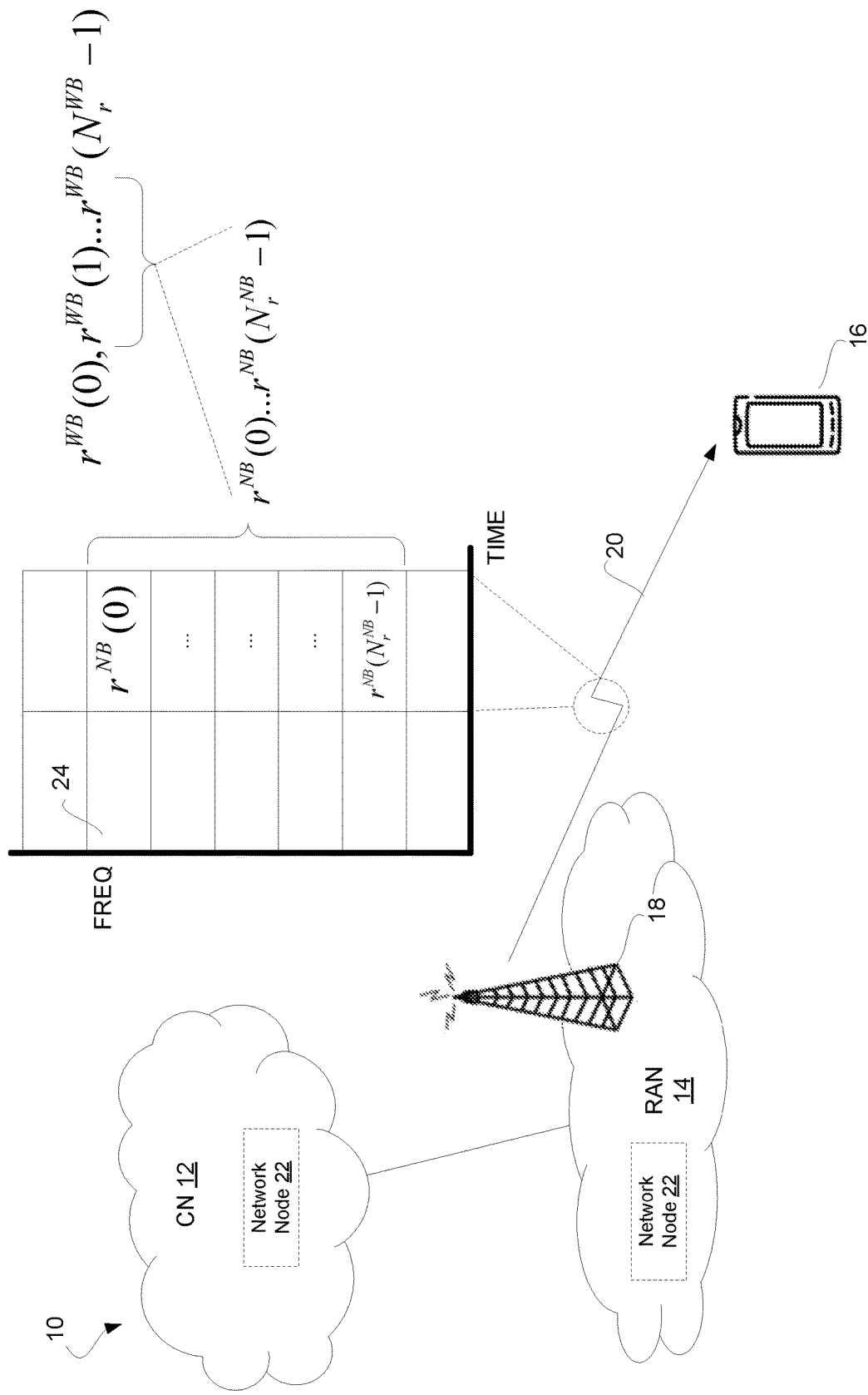
FIG. 1 is a block diagram of a wireless communication system that includes a radio network node and a wireless communication device according to some embodiments herein.

FIG. 1 illustrates a narrowband wireless communication system 10 (e.g., a cellular internet of things, CIoT, system, such as NB-IoT) according to some embodiments. As shown, the system 10 includes a core network (CN) 12 and a radio access network (RAN) 14. The CN 12 connects one or more wireless communication devices 16 (e.g., user equipment, UE) to one or more external networks via the RAN 14. The one or more external networks may include for instance a public switched telephone network (PSTN) or a packet data network (PDN) such as the Internet.

The RAN 14 includes one or more radio network nodes 18 (e.g., base stations, transmission points, or the like), one of which is shown. Each radio network node 18 transmits and/or receives radio signals so as to provide radio coverage for the wireless communication device(s) 16. By way of this radio coverage, each radio network node 18 provides the wireless communication device(s) 16 with access to the CN 12.

A radio network node 18 as shown in FIG. 1 is configured to generate and transmit a narrowband positioning reference signal 20 to a wireless communication device 16. In some embodiments, this narrowband positioning reference signal 20 is designed or dedicated specifically for the purpose of geographical positioning. The device 16 in this regard may detect this narrowband positioning reference signal 20 and perform a positioning measurement using the signal 20. The device 16 may perform such a positioning measurement using one or more other narrowband positioning reference signals (not shown) from one or more other radio network nodes 18. The positioning measurement may be for instance a reference signal time difference (RSTD) or observed time difference of arrival (OTDOA) measurement. Having performed the positioning measurement, the device 16 in some embodiments may determine a geographical position of the device 16 itself, or may report the positioning measurement result to one or more other nodes in the system 10 that are configured to determine or assist in the determination of the device's position. The device 16 may for instance report the positioning measurement result to the radio network node 18 or to another network node 22 (e.g., a positioning server) in the RAN 14 or CN 12.

The narrowband positioning reference signal 20 comprises a narrowband reference signal sequence. FIG. 1 shows this sequence as being the sequence $r^{NB} = r^{NB}(0) \ldots r^{NB}(N_r^{NB}-1)$ with $N_r^{NB} \geq 2$ elements in the sequence, e.g., mapped onto (non-consecutive) radio resources 24 along the frequency domain. The elements in the sequence may be for instance reference symbol values, such as from a pseudo-random quadrature phase shift keying (QPSK) sequence.

Regardless, this narrowband reference signal sequence is a subsequence of a so-called wideband reference signal sequence (which itself may be a pseudo-random QPSK sequence). FIG. 1 for instance shows the wideband reference signal sequence as being the sequence $r^{WB} = r^{WB}(0), r^{WB}(1) \ldots r^{WB}(N_r^{WB}-1)$ with $N_r^{WB} \geq 3$ elements in the sequence.

Notably, the wideband reference signal sequence is configured for a wideband frequency bandwidth that is wider than a maximum frequency bandwidth defined for the narrowband wireless communication system 10. In some embodiments, for example, the maximum frequency bandwidth defined for the narrowband system 10 is 180 kHz, such as where the system 10 is a narrowband internet of things (NB-IoT) system. In this case, then, the wideband reference signal sequence is configured for a wideband frequency bandwidth that is wider than 180 kHz. In fact, in some embodiments, the wideband reference signal sequence is configured for a wideband wireless communication system, such as a Long Term Evolution (LTE) (e.g., the wideband sequence is an LTE reference signal sequence that is defined for and/or usable for LTE). In this case, then, the wideband reference signal sequence may be configured for a maximum frequency bandwidth defined for the wideband system, rather than a maximum frequency bandwidth defined for the narrowband system 10. For example, the wideband reference signal sequence in some embodiments is configured for a maximum frequency bandwidth defined for an LTE system, e.g., approximately 20 Mhz. In these and other embodiments, the narrowband wireless communication system 10 may even be deployed inband or in a guardband of the wideband system.

In some embodiments, the wideband reference signal sequence is configured for a wider bandwidth than the maximum bandwidth defined for the narrowband system 10 in the sense that the wideband reference signal sequence includes more elements than are able to be mapped across that maximum bandwidth, e.g., according to a defined resource mapping scheme or pattern. In one embodiment, for instance, the narrowband positioning reference signal is transmitted within a narrowband frequency bandwidth comprising $N_{RB}^{NPRS}$ resource blocks (e.g., a physical resource block, PRB, as defined in LTE). This means that the narrowband reference signal sequence is mapped to radio resources within this narrowband frequency bandwidth. In particular, $E_{NB}$ elements from the narrowband reference signal sequence are mapped to $E_{NB}$ (non-consecutive) radio resources within each resource block. In this case, the wideband reference signal sequence may include more than $E_{NB} \cdot N_{RB}^{max,NB}$ elements, where $N_{RB}^{max,NB} \geq N_{RB}^{NPRS}$ comprises a number of resource blocks that span the maximum frequency bandwidth defined for the narrowband wireless communication system 10. For example, in some NB-IoT embodiments, the narrowband positioning reference signal is transmitted within a narrowband frequency bandwidth comprising 1 resource block, with 2 elements from the size 2 narrowband reference signal sequence mapped to 2 (non-consecutive) radio resources within each resource block. In this case, the wideband (e.g., LTE) reference signal sequence may include more than 2=2*1 elements, where the maximum frequency bandwidth $N_{RB}^{max,NB}$ defined for the narrowband system 10 is a single resource block (i.e., $N_{RB}^{max,NB} = N_{RB}^{NPRS}$). In some embodiments, therefore, positioning measurements for the narrowband system 10 (e.g., NB-Iot) are based on LTE PRS truncated to the narrowband bandwidth in which the narrowband positioning reference signal is transmitted.

Figures 2A, 2B:
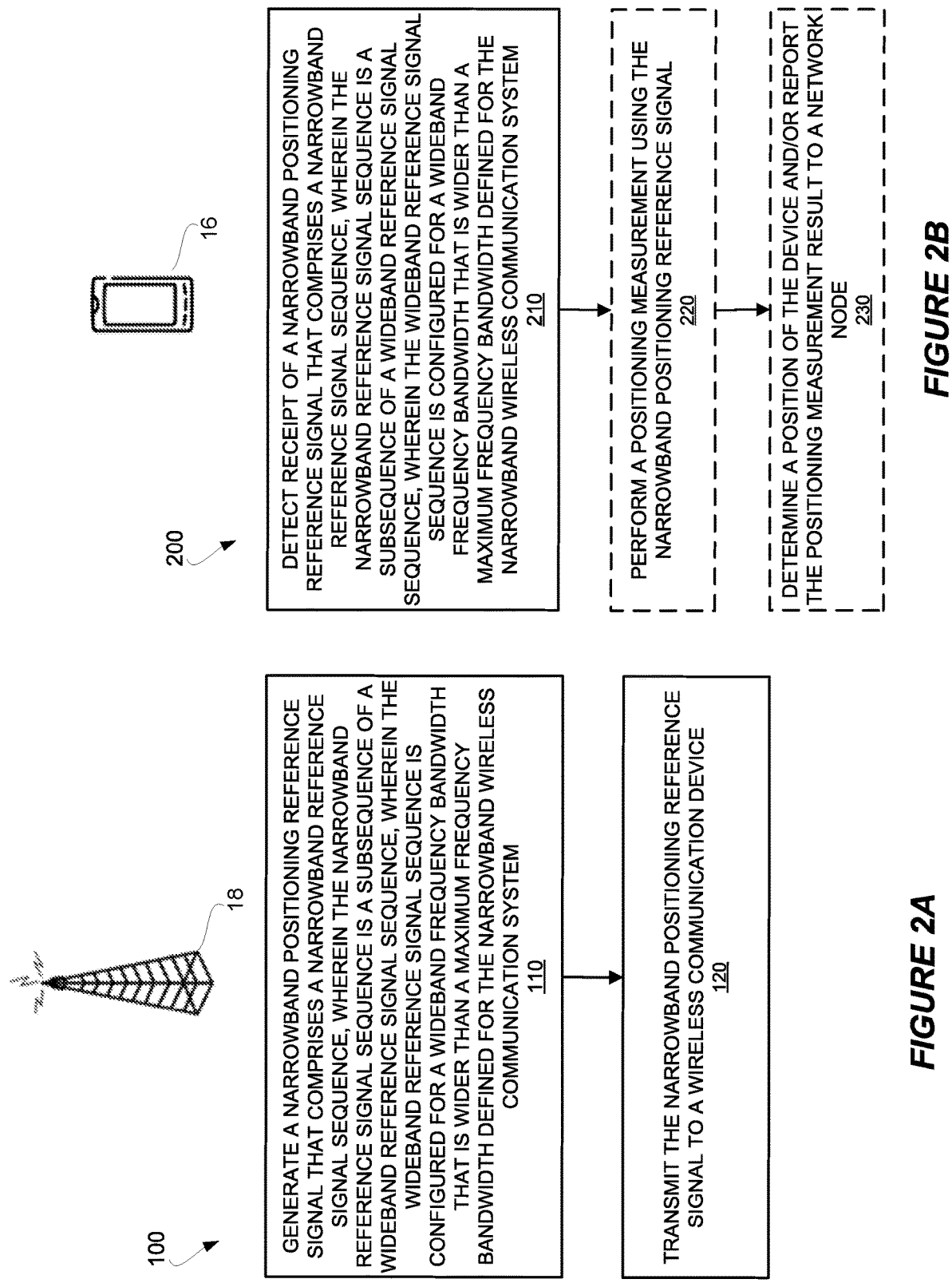
FIG. 2A is a logic flow diagram of a method performed by a radio network node according to some embodiments herein.
FIG. 2B is a logic flow diagram of a method performed by a wireless communication device according to some embodiments herein.

With this in mind, FIG. 2A illustrates a method 100 performed by a radio network node 18 configured for operation in the narrowband wireless communication system 10 according to some embodiments. The method 100 comprises generating a narrowband positioning reference signal 20 that comprises a narrowband reference signal sequence (Block 110). The narrowband reference signal sequence is a subsequence of a wideband reference signal sequence. The wideband reference signal sequence is configured for a wideband frequency bandwidth that is wider than a maximum frequency bandwidth defined for the narrowband wireless communication system 10. The method 100 also comprises transmitting the narrowband positioning reference signal 20 to a wireless communication device 16, e.g., for performance of a positioning measurement (Block 120).

FIG. 2B illustrates a corresponding method 200 performed by a wireless communication device 16 (e.g., UE) configured for operation in a narrowband wireless communication system 10 according to some embodiments. The method 200 comprises detecting receipt of a narrowband positioning reference signal 20 that comprises a narrowband reference signal sequence (Block 210). The narrowband reference signal sequence is a subsequence of a wideband reference signal sequence. The wideband reference signal sequence is configured for a wideband frequency bandwidth that is wider than a maximum frequency bandwidth defined for the narrowband wireless communication system 10. The method 200 may also comprise performing a positioning measurement (e.g., Reference Signal Time Difference, RSTD, or Observed Time Difference of Arrival, OTDOA) using the narrowband positioning reference signal (Block 220). In some embodiments, the method 200 further comprises determining a position of the device 16 using a result of the positioning measurement and/or reporting the positioning measurement result to a network node (e.g., network node 22). (Block 230).

Figure 3:
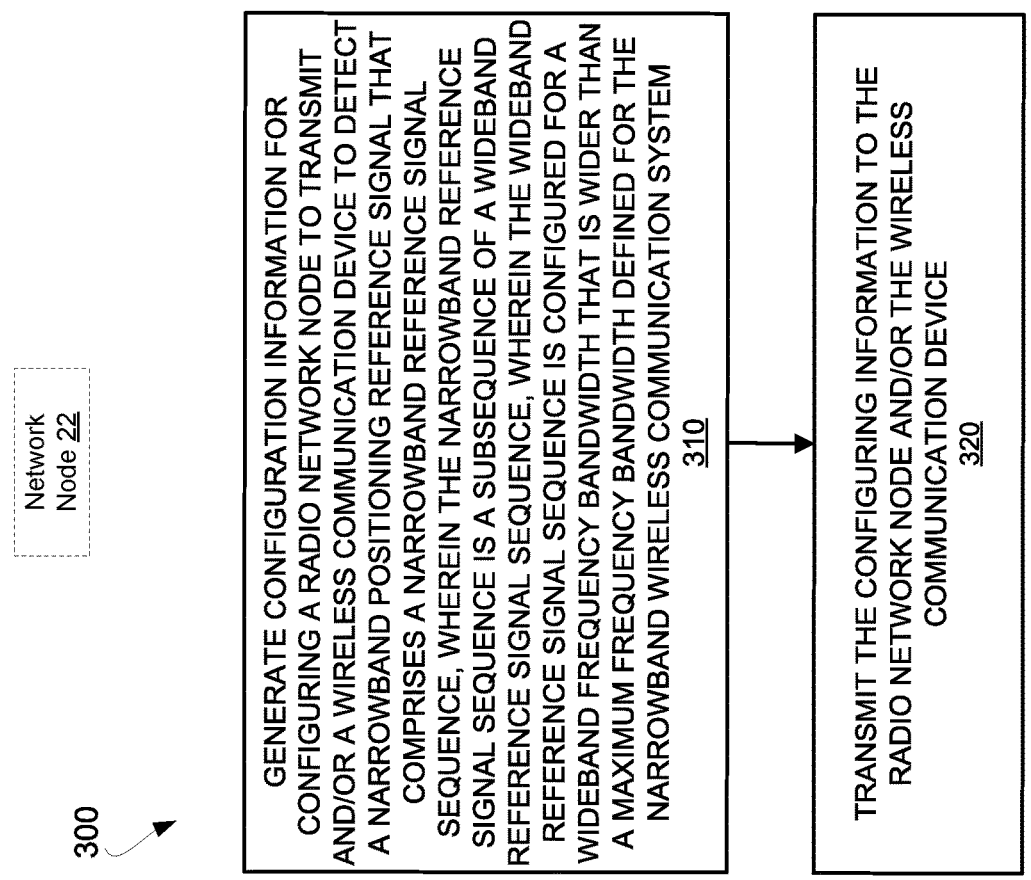
FIG. 3 is a logic flow diagram of a method performed by a network node according to some embodiments.

FIG. 3 further illustrates a corresponding method 300 performed by a network node 22 configured for operation in a narrowband wireless communication system 10. The method 300 comprises generating configuration information for configuring a radio network node 18 to transmit and/or a wireless communication device 16 to detect a narrowband positioning reference signal 20 that comprises a narrowband reference signal sequence (Block 310). The narrowband reference signal sequence is a subsequence of a wideband reference signal sequence. The wideband reference signal sequence is configured for a wideband frequency bandwidth that is wider than a maximum frequency bandwidth defined for the narrowband wireless communication system. The method 300 further comprises transmitting the configuring information to the radio network node 18 and/or the wireless communication device 16, e.g., as part of configuring performance of a positioning measurement using the narrowband positioning reference signal 20 (Block 320). The configuration information may be a part of positioning assistance data (similar to that for Long Term Evolution, LTE, positioning). Regardless, the configuration information may be transmitted in the form of system information, radio resource control (RRC) signaling, and/or communication packets of a positioning protocol (e.g., LTE Positioning Protocol, LPP).

In some embodiments, the configuration information may indicate that the narrowband reference signal sequence is a particular one of different possible subsequences of the wideband reference signal sequence. Alternatively or additionally, the configuration information may indicate which if any subframes are defined as invalid narrowband positioning reference signal subframes.

In some embodiments, the wideband reference signal sequence is a pseudo-random quadrature phase shift keying (QPSK) sequence. In one or more embodiments, for instance, the narrowband reference signal sequence is mapped to frequency resources within a (OFDM) symbol l and time slot $n_s$, and is a subsequence of the wideband reference signal sequence $r_{l,n_s}(m)$ defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

where $n_s$ is a slot number within a (10 ms) radio frame, l is a symbol number within the slot, c(i) is a pseudo-random sequence, and $N_{RB}^{max,DL}$ is a number of resource blocks within the wideband frequency bandwidth for which the wideband reference signal sequence is configured. In some embodiments, the pseudo-random sequence c(i) is initialized with a cell identity $N_{ID}^{Ncell}$ of a cell of the narrowband wireless communication system in which the narrowband positioning reference signal is transmitted.

In some embodiments, the narrowband reference signal 20 constitutes the narrowband reference signal sequence as mapped to frequency resources within the symbol l and the time slot $n_s$. In terms of FIG. 1, the wideband reference signal sequence $r^{WB}$ may be equal to $r_{l,n_s}(m)$. And the narrowband reference signal sequence $r^{NB}$ may be equal to a sequence $r_{l,n_s}(m)$ that is a subsequence of $r_{l,n_s}(m)$. In some embodiments, a narrowband reference signal is transmitted in each respective symbol of a time slot, with each narrowband reference signal being a subsequence of a different wideband reference signal sequence (e.g., the wideband sequence $r_{l,n_s}(m)$ is different for different symbols in a time slot).

In one or more embodiments, the narrowband reference signal sequence may be a sequence $r_{l,n_s}(m)$ that includes $E_{NB} \cdot N_{RB}^{NPRS}$ elements, where the narrowband positioning reference signal is transmitted within a narrowband frequency bandwidth comprising $N_{RB}^{NPRS}$ resource blocks. In some embodiments, $E_{NB}$ equals 2.

Regardless, in one or more embodiments, m'=m+$N_{RB}^{max,DL}$-$N_{RB}^{NPRS}$. In this and other embodiments, therefore, the narrowband reference signal sequence may comprise $E_{NB} \cdot N_{RB}^{NPRS}$ elements at the center of the wideband reference signal sequence. Alternatively, in one or more embodiments, m'=m+$N_{RB}^{max,DL}$-$I_{RB}$ where the wideband frequency bandwidth includes multiple resource blocks indexed with respective indices, and wherein the narrowband positioning reference signal is transmitted within a narrowband frequency bandwidth that is within the wideband frequency bandwidth and that comprises $N_{RB}^{NPRS}$ resource blocks, the first of which has an index $I_{RB}$ that is one of those indices. In some embodiments, therefore, the narrowband reference signal sequence may be a subsequence at a position within the wideband reference signal sequence that depends on a relative position of the narrowband wireless communication system 10 within a system bandwidth of a wideband wireless communication system for which the wideband reference signal is configured (e.g., for inband or guardband NB-IoT scenarios). In this and other cases, the configuration information from the network node 22 may indicate that the narrowband reference signal sequence is a particular one of different possible subsequences of the wideband reference signal sequence.

One or more embodiments will now be described using NB-IoT and Further enhanced MTC (FeMTC) as example systems in which a positioning measurement in the form of OTDOA is to be performed.

Figure 4:
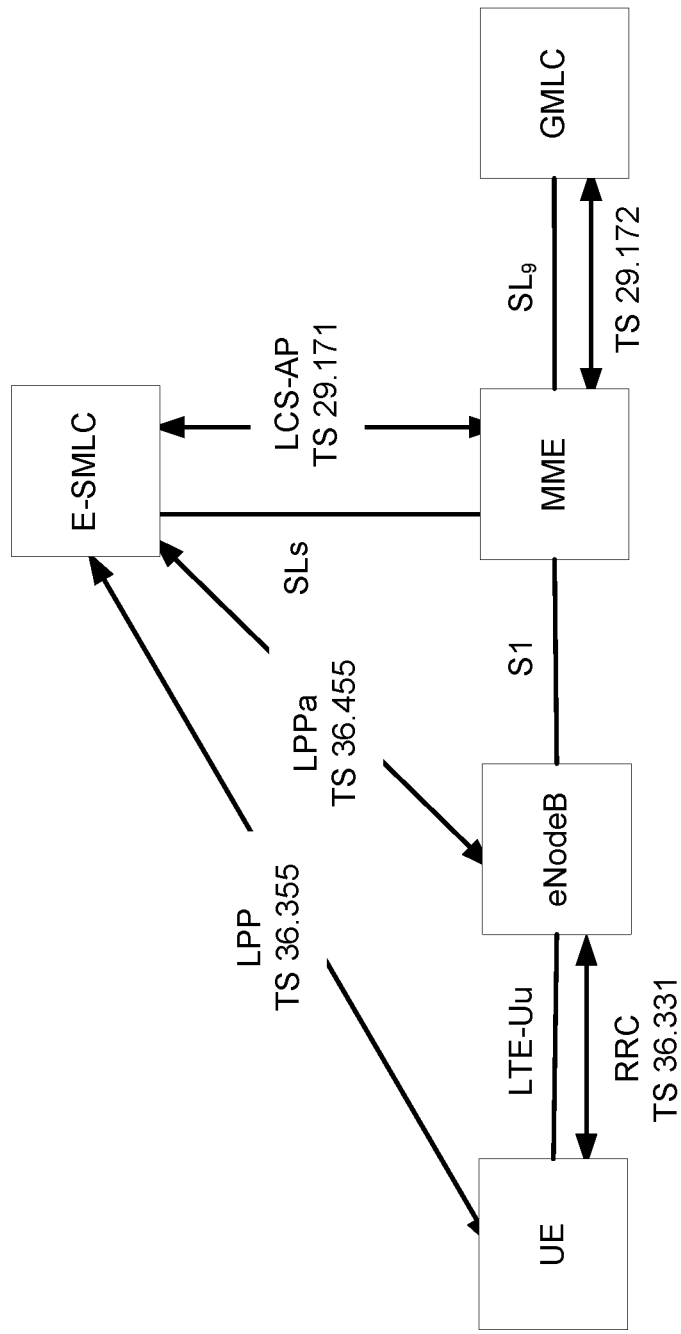
FIG. 4 is a block diagram of a Long Term Evolution (LTE) architecture for positioning.

Positioning in LTE is supported by the architecture in FIG. 4, with direct interactions between a UE and a location server (E-SMLC) being via the LTE Positioning Protocol (LPP). Moreover, there are also interactions between the location server and the eNodeB via the LPP A (LPPa) protocol, to some extent supported by interactions between the eNodeB and the UE via the Radio Resource Control (RRC) protocol.

The following positioning techniques are considered in LTE: Enhanced Cell ID, Assisted global navigation satellite system (GNSS), OTDOA (Observed Time Difference of Arrival), and UTDOA (Uplink TDOA). Enhanced Cell ID uses cell ID information to associate the UE to the serving area of a serving cell, and then additional information to determine a finer granularity position. In assisted GNSS, GNSS information is retrieved by the UE, supported by assistance information provided to the UE from enhanced serving mobile location center (E-SMLC). In OTDOA, the UE estimates the time difference of reference signals from different base stations and sends to the E-SMLC for multilateration. In UTDOA, the UE is requested to transmit a specific waveform that is detected by multiple location measurement units (e.g. an eNB) at known positions. These measurements are forwarded to E-SMLC for multilateration.

In LTE OTDOA, a positioning server, e.g. an E-SMLC, requests the position of a UE which triggers the UE to estimate time of arrival (TOA) of signals received from multiple eNBs. The TOAs from several neighboring eNBs are subtracted from a TOA from a reference eNB to form Observed Time Difference of Arrivals that the UE reports to the network. These measurements are known as Reference Signal Time Difference (RSTD) measurements. Based on the reported RSTD measurements and known positions of the involved eNBs, the positioning server can estimate the position of the UE by using multilateration techniques.

Positioning reference signals (PRS) in this regard are transmitted in pre-defined positioning sub-frames grouped by several consecutive sub-frames ($N_{PRS}$), i.e., one positioning occasion. One positioning occasion may include PRS transmitted in $N_{PRS}=6$ consecutive sub-frames. Positioning occasions occur periodically with a defined periodicity $T_{PRS}$ of N sub-frames, i.e., the time interval between two positioning occasions. The standardized periods $T_{PRS}$ are 160, 320, 640, and 1280 ms, and the standardized number of consecutive sub-frames $N_{PRS}$ may be 1, 2, 4, or 6

Information about such PRS and other information that will assist with positioning measurements is included in so-called assistance data. Different sets of assistance data are typically used for different methods. Regardless, the positioning assistance data is sent by the positioning server, or via some other node, to UEs or other radio nodes in order to assist with positioning measurements. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

In LTE, the assistance data may be requested and provided over LPP protocol by including requestAssistanceData and provideAssistanceData elements in the LPP message, respectively. The LTE assistance data may be provided for A-GNSS and OTDOA. The EPDU-Sequence contains information elements (IEs) that are defined externally to LPP by other organizations, which currently may only be used for Open Mobile Alliance (OMA) LPP extensions (LPPe).

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among other things, reference cell information, a neighbour cell list containing Physical Cell Identifiers (PCIs) of neighbour cells, the number of consecutive downlink subframes within a positioning occasion, PRS transmission bandwidth, frequency, etc.

While exploring the existing positioning solutions for NB-IoT, the downlink (DL) based positioning OTDOA is supported for Rel.14 positioning of NB-IoT, since the overhead of positioning reference signal does not need to scale with the number of UEs requiring positioning and thus is a scalable solution.

Beside NB-IoT, LTE Release 13 also introduced UE category M1 (see 3GPP TS 36.306 V13.2.0) which addresses somewhat more demanding MTC applications. UE category M1 is associated with a maximum channel bandwidth of 6 PRBs (corresponding to 1.08 MHz excluding guard bands or 1.4 MHz including guard bands), which can be compared to 1 PRB for NB-IoT UEs or 100 PRBs for higher LTE UE categories. Furthermore, 3GPP has initiated a LTE Release 14 work item on "Further enhanced MTC" (FeMTC) where a UE type based on UE category M1 with a maximum channel bandwidth of approximately 25 PRBs (corresponding to 4.5 MHz excluding guard bands and 5 MHz including guard bands) will be specified in order to address even more demanding applications (See 3GPP RP-161464). In this FeMTC work item, OTDOA improvements with respect to positioning accuracy, UE complexity and power consumption for these (6-PRB and 25-PRB) UEs are also being considered for standardization.

The existing OTDOA approach has the following drawbacks for a positioning solution for NB-IoT. First, positioning reference signals (PRS) which are the main OTDOA's reference signal used in an LTE network are not available in NB-IoT.

Second, in principle, RSTD measurements for NB-IoT OTDOA can be based on any existing Rel-13 DL signals including narrowband primary synchronization signal (NPSS), narrowband secondary synchronization signal (NSSS), and narrowband reference signal (NRS). These signals however have not been designed for positioning purpose and thus each has one or more disadvantages described below.

Configuration inflexibility: The configurations of NPSS and NSSS are fixed. NRS configuration may be changed using valid subframe pattern configuration but this involves system information change, leading to impact on UEs not involved in positioning.

Interference: RSTD measurements based on NPSS/NSSS/NRS may experience significant interference. In particular, when a UE attempts to measure TOA from a neighboring cell, the interference power from its serving cell could be several tens of dBs above the desired signal power, leading to poor TOA estimate. It may be possible to introduce inter-eNB coordination to reduce such interference, e.g., mute serving cell signal to enable better hearability from non-serving cells. But such mechanisms may be quite complex to be completed in Rel-14. Moreover, they may have impact on UEs not involved in positioning, and it is also not clear how to make them backward compatible with Rel-13 NB-IoT UEs.

Lack of synergy with legacy LTE PRS and/or PRS in FeMTC: Inband deployment is an important deployment mode for NB-IoT. If the positioning reference signal for NB-IoT can be designed to maintain synergy with e.g. legacy LTE PRS, then it is possible for LTE UEs to combine positioning reference signal in NB-IoT and PRS in non-NB-IoT physical resource blocks (PRBs) for RSTD measurements. This synergy can lead to improved radio resource utilization efficiency. On the other hand, lack of synergy may require different cell planning/different resource element mapping/sequence generation for NB-IoT and LTE networks that are highly undesirable.

Cell identification: NPSS sequence is the same across all cells. It can be hard for UE to differentiate NPSS signals from different cells.

Non-unified design for inband, guardband, and standalone deployments: LTE CRS in 1 PRB is only available for inband deployment. This may lead to a non-unified OTDOA design for inband, guardband, and standalone deployments.

Hence, to enable efficient and flexible DL based positioning for NB-IoT, a new positioning reference signal and its associated configuration mechanism need to be defined.

Some embodiments herein define such a new positioning reference signal as a sequence generated in a certain way. Specifically, the sequence is generated in some embodiments using the PRS sequence whose formula is given in Section 6.10.4 of 3GPP TS 36.211 V13.2.0 (2016-06). In particular, the reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$

where $n_s$ is the slot number within a radio frame, l is the OFDM symbol number within the slot. The pseudo-random sequence c(i) is defined in clause 7.2 of 3GPP TS 36.211 V13.2.0 (2016-06). In particular, pseudo-random sequences are defined by a length-31 Gold sequence. The output sequence c(n) of length $M_{PN}$, where n=0, 1, ..., $M_{PN}$−1, is defined by $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_C$=1600 and the first m-sequence shall be initialized with $x_1(0)$=1, $x_1(n)$=0, n=1, 2, ..., 30. The initialization of the second m-sequence is denoted by $c_{init}=\Sigma_{i=0}^{30} x_2(i) \cdot 2^i$ with the value depending on the application of the sequence. In this application, the pseudo-random sequence generator shall be initialized with $c_{init}=2^{10} \cdot (7 \cdot (n_s+1)+l+1) \cdot (2 \cdot N_{ID}^{cell}+1)+2 \cdot N_{ID}^{cell}+N_{CP}$ at the start of each OFDM symbol where $$N_{CP} = \begin{cases} 1 & \text{for normal } CP \\ 0 & \text{for extended } CP \end{cases}.$$

In a first embodiment, NPRS sequence generation reuses the formula of pseudo-random QPSK sequence defined for PRS. But the LTE cell ID $N_{ID}^{cell}$ used in the initialization is replaced by NB-IoT cell ID $N_{ID}^{Ncell}$. (The sequence generation formula may have changed in Rel.14 to solve the OTDOA same PCI issue, however, the concept of replacing the LTE cell ID with the NB-IoT cell ID is still a valid assumption.)

Figure 5:
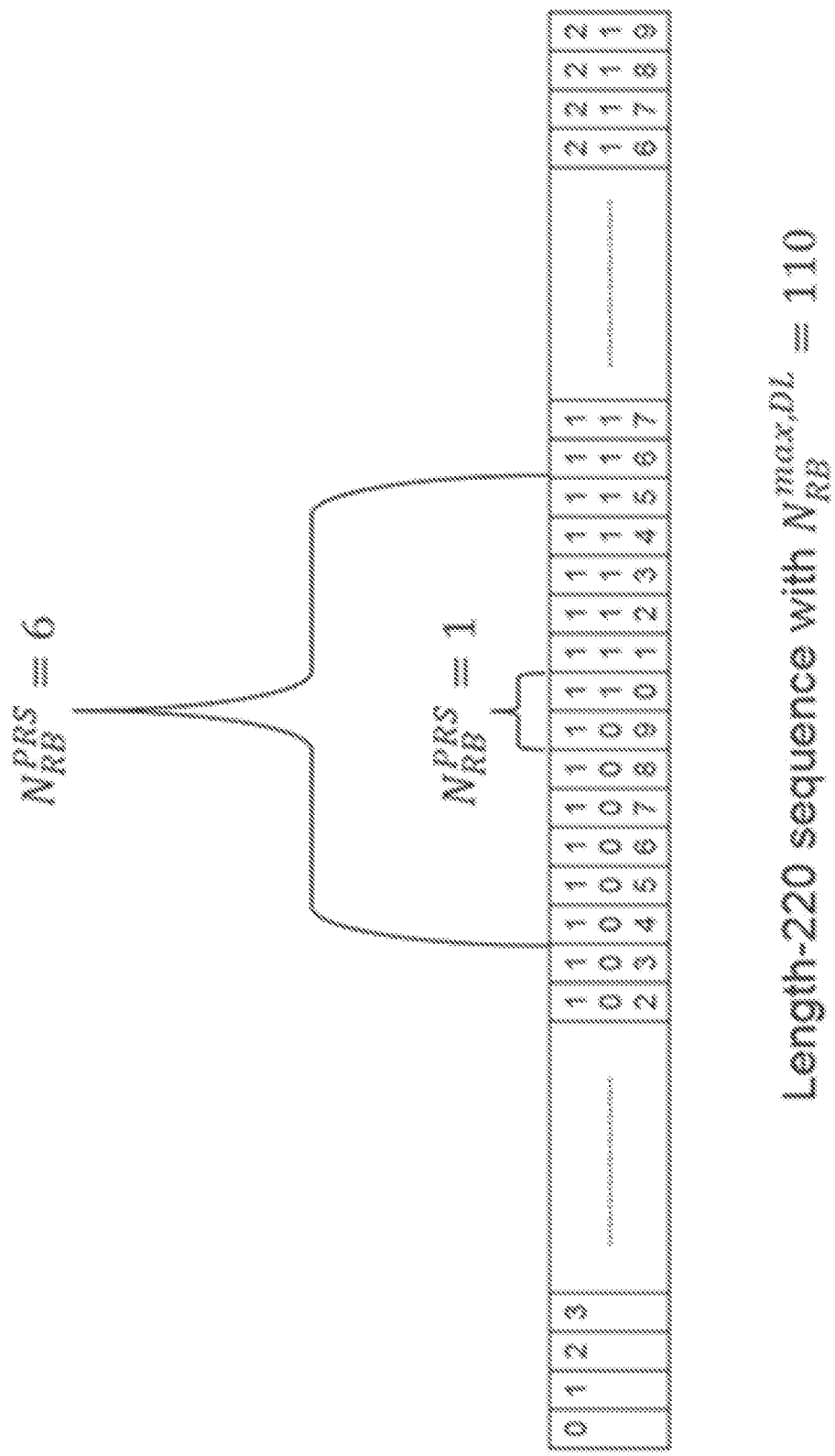
FIG. 5 is a block diagram of a narrowband reference signal sequence truncated from a wideband reference signal sequence according to some embodiments.

Consider now how to map the reference signal sequence to resource elements. The PRS sequence is defined such that it can cover the maximum LTE bandwidth that has $N_{RB}^{max,DL}$ PRBs. In NB-IoT using 1 PRB, the sequence in some embodiments is truncated and only a portion of the sequence is used for NPRS. In legacy LTE, with $N_{RB}^{PRS}$ PRBs configured for positioning, a subsequence of $2 \cdot N_{RB}^{PRS}$ elements (m=0, 1, ..., $2 \cdot N_{RB}^{PRS}-1$) is obtained from truncating the reference-signal sequence to obtain $r_{l,n_s}(m')$, where m'=m+$N_{RB}^{max,DL}-N_{RB}^{PRS}$. This mapping is illustrated in FIG. 5. From FIG. 5, it can be seen that the used PRS sequence is the center part of the whole reference-signal sequence defined for $N_{RB}^{max,DL}$=110 PRBs.

The following embodiments describe which part of the whole reference-signal sequence is used for NPRS.

In Embodiment 2.1, a fixed subsequence of length-2 truncated from the reference-signal sequence is used for NPRS. As a non-limiting embodiment, the fixed subsequence may be the center two elements (109 and 110) shown in FIG. 5. This embodiment may for example be appropriate for standalone deployment.

In Embodiment 2.2, a subsequence of length-2 truncated from the reference-signal sequence is used for NPRS. The position of the subsequence depends on the relative location of NB-IoT in a LTE carrier (including guardband). As a nonlimiting embodiment, the sequence can be the two elements m'=m+$N_{RB}^{max,DL}-I_{RB}^{NB,IOT}$, m=0, 1, where $I_{RB}^{NB,IOT}$ is the index of the PRB used by NB-IoT in inband or guardband deoployment. This embodiment may for example be appropriate for inband/guardband deployment.

In Embodiment 2.3, a subsequence of length-2 truncated from the reference-signal sequence is used for NPRS. The position of the subsequence is signaled to UE via system information, or RRC signaling, or communication packets in positioning protocol, or a combination of any of the previous methods. This embodiment may be used in case the network wants more control of the used subsequence. For example, a cell may have 3 remote radio heads (RRH) that share the same cell ID. But the network may signal different subsequences to the 3 RRHs, enabling UE to differentiate the signals from different RRHs.

The following parallel embodiments apply to FeMTC.

In Embodiment 2.4, the length of PRS subsequence is configurable for FeMTC. For FeMTC with 1.4 MHz UE bandwidth, the lengths of PRS subsequence may be a subset of {L=2x, x=1, ..., 6}. For FeMTC with 5 MHz UE bandwidth, the length of PRS subsequence may be a subset of {L=2x, x=1, ..., 25}.

In Embodiment 2.5, a fixed subsequence of length-L truncated from the reference-signal sequence is used for FeMTC PRS. As a nonlimiting embodiment, the fixed subsequence can be the center L elements shown in FIG. 5. This embodiment may for example be appropriate if the sequence does not hop with FeMTC.

In Embodiment 2.6, a subsequence of length-L truncated from the reference-signal sequence is used for FeMTC PRS. The position of the subsequence depends on the relative location of FeMTC in a LTE carrier. As a nonlimiting embodiment, the sequence can be the L elements $m'=m+N_{RB}^{max,DL}-I_{RB}^{FeMTC}$, where $I_{RB}^{FeMTC}$ is the starting index of the PRB used by FeMTC for OTDOA. This embodiment may for example be appropriate if the sequence hops with FeMTC.

In Embodiment 2.7, a subsequence of length-L truncated from the reference-signal sequence is used for FeMTC PRS. The position of the subsequence is signaled to UE via system information, or RRC signaling, or communication packets in positioning protocol, or a combination of any of the previous methods.

Figure 6:
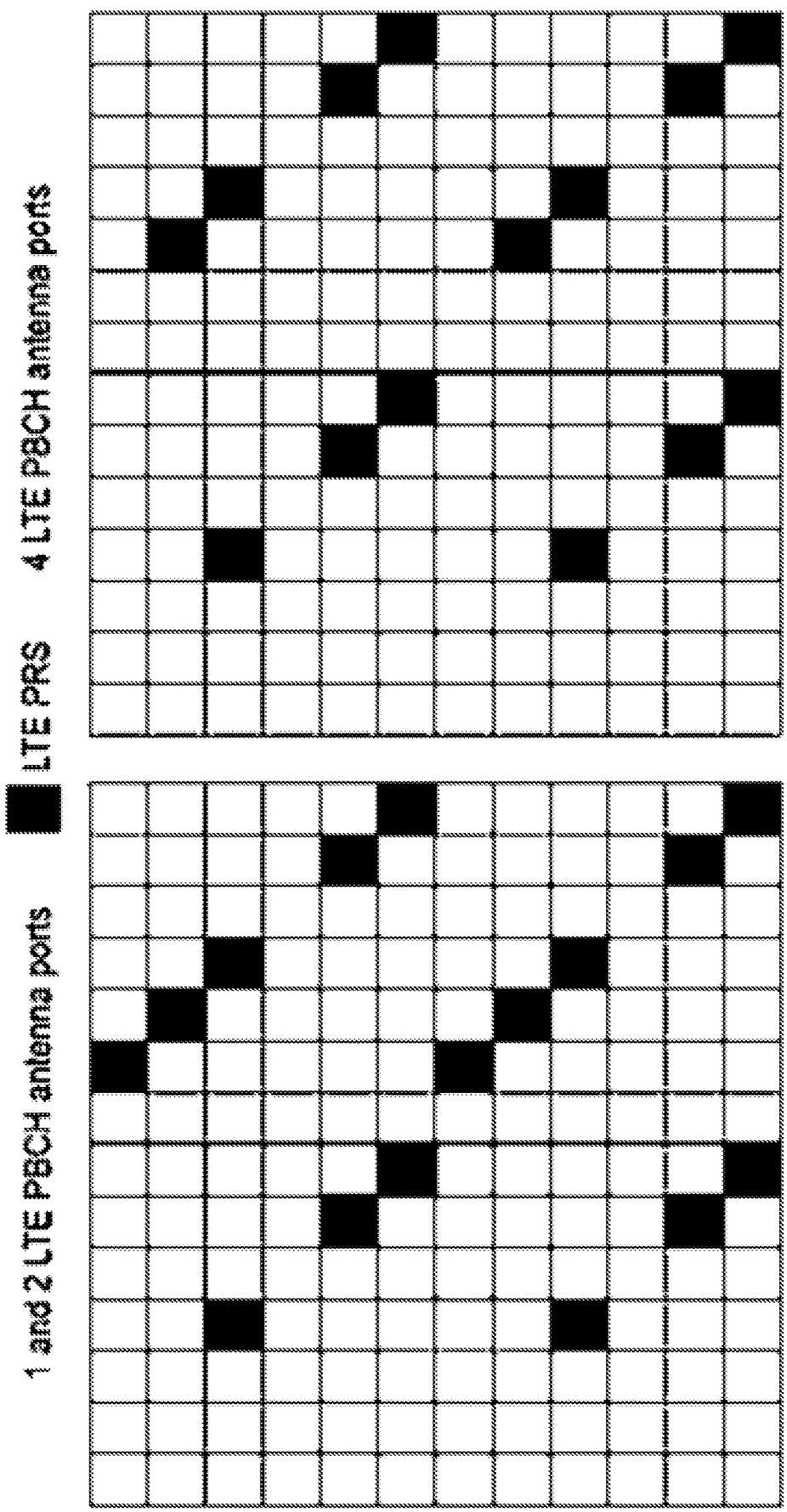
FIG. 6 is a block diagram of a mapping pattern for LTE PRS.

Consider now how the elements of the NPRS sequence are mapped to resource elements in the orthogonal frequency division multiplexing (OFDM) resource grid. The legacy LTE PRS mapping pattern is shown in FIG. 6. It can be seen that the pattern is a diagonal pattern mapped to all OFDM symbols except OFDM symbols falling in the potential physical downlink control channel (PDCCH) region (the first 3 OFDM symbols in a subframe) and OFDM symbols that may be used by a cell-specific reference signal (CRS). Also note that FIG. 6 shows an example shift in frequency domain. The shift in the mapping is a function of cell ID: $v_{shift}\, N_{ID}^{cell}$ mod 6 which yields a total of 6 possible shifts.

More particularly, PRS mapping is performed according to the following. The reference signal sequence $r_{l,n_s}(m)$ shall be mapped to complex-valued modulation symbols $\alpha_{k,l}^{(p)}$ used as reference signal for antenna port p=6 in slot $n_s$ according to $\alpha_{k,l}^{(p)}=r_{l,n_s}(m')$ where Normal Cyclic Prefix:

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & \text{(1 or 2 PBCH antenna ports)} \\ 2, 3, 5, 6 & \text{if } n_s \bmod 2 = 1 \text{ and} \\ & \text{(4 PBCH antenna ports)} \end{cases}$$

$$m = 0, 1, \ldots, 2 \cdot N_{RB}^{PRS} - 1$$
$$m' = m + N_{RB}^{max,DL} - N_{RB}^{PRS}$$

Extended Cyclic Prefix:

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and} \\ & \text{(1 or 2 PBCH antenna ports)} \\ 2, 4, 5 & \text{if } n_s \bmod 2 = 1 \text{ and} \\ & \text{(4 PBCH antenna ports)} \end{cases}$$

$$m = 0, 1, \ldots, 2 \cdot N_{RB}^{PRS} - 1$$
$$m' = m + N_{RB}^{max,DL} - N_{RB}^{PRS}$$

The bandwidth for positioning reference signals $N_{RB}^{PRS}$ is configured by higher layers and the cell-specific frequency shift is given by $v_{shift}=N_{ID}^{cell}$ mod 6.

In another embodiment, the NPRS pattern has a subframe-based frequency shift. That is, the v_shift is a function of the subframe number and the cell_id. This is useful in order to reduce static interference from cells with the same PCI compared with using $v_{shift}=N_{ID}^{cell}$ mod 6.

To maintain synergy with LTE PRS, it is proposed in some embodiments that NPRS also adopts a diagonal mapping pattern. But the pattern may be tailored to NB-IoT according to any number of embodiments.

Figure 7:
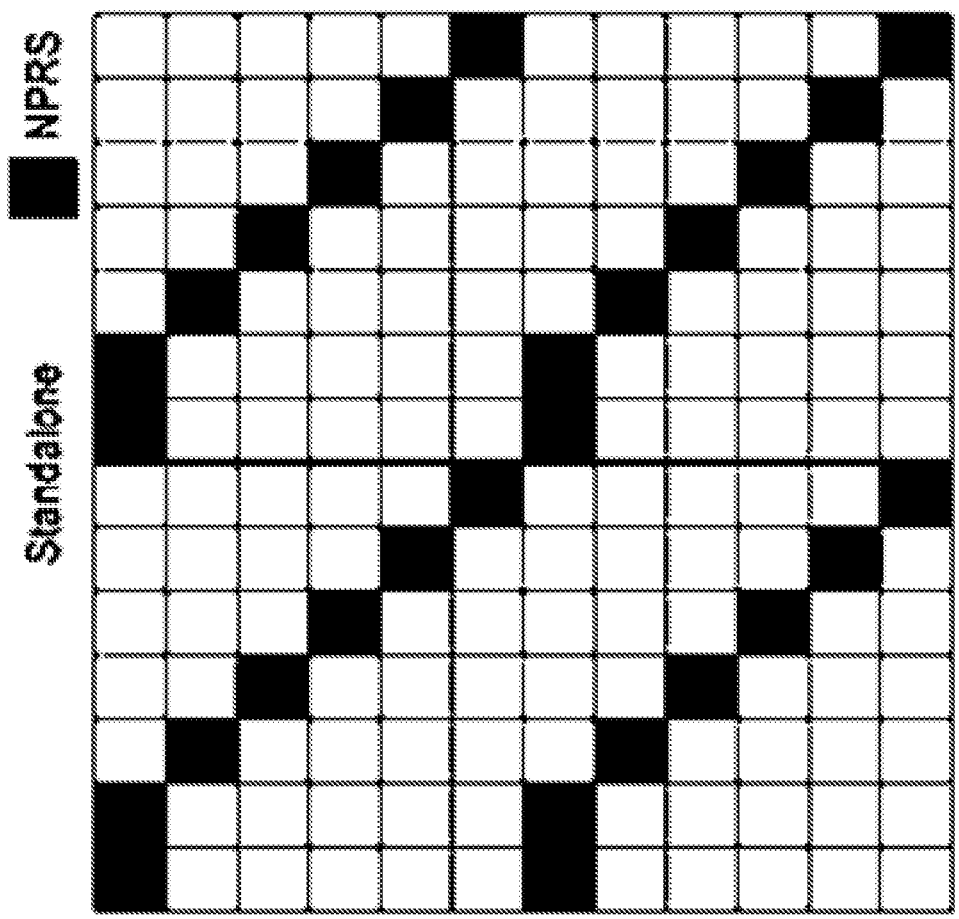
FIG. 7 is a block diagram of a mapping pattern for narrowband PRS according to some embodiments.

In embodiment 3.1, NPRS symbols are mapped to all OFDM symbols in a diagonal way. A non-limiting embodiment is shown in FIG. 7. This embodiment is appropriate for standalone deployment with NRS muting, since the mapping need not be concerned about the legacy PDCCH region and LTE CRS. Indeed, it is beneficial to reclaim the resource elements punctured in the diagonal pattern of LTE PRS (due to the legacy PDCCH region and LTE CRS) for NB-IoT standalone or guardband deployment. This may for instance lead to 2.43 dB energy gain for standalone or guardband deployment where LTE CRS is not transmitted.

Figure 8:
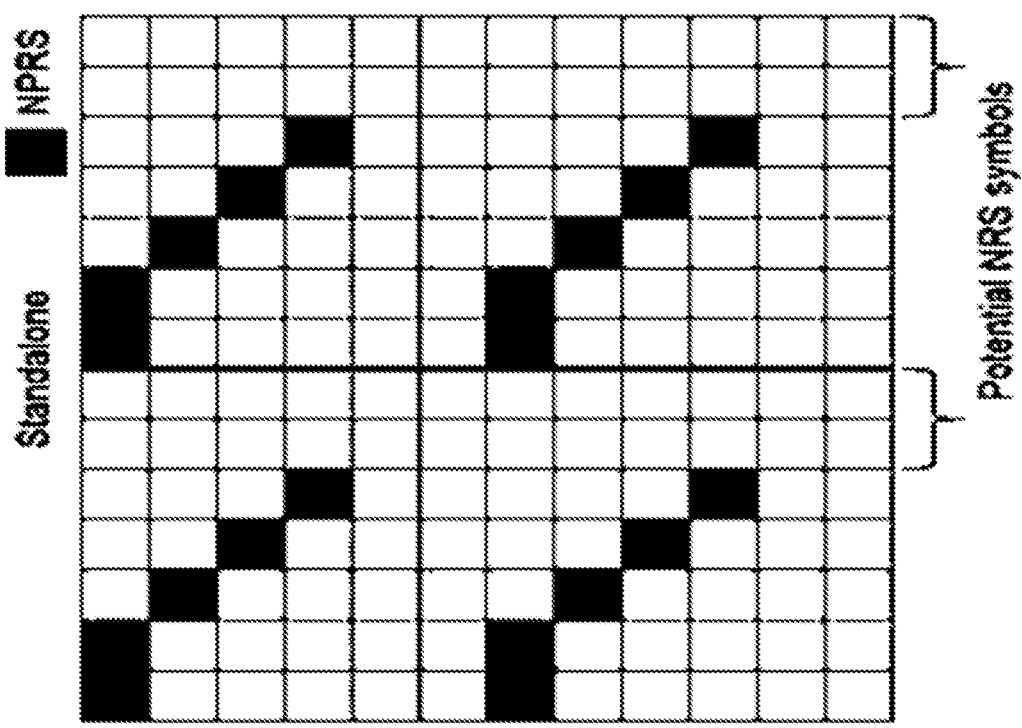
FIG. 8 is a block diagram of a mapping pattern for narrowband PRS according to other embodiments.

In embodiment 3.2, NPRS symbols are mapped to all OFDM symbols in a diagonal way, except the last two OFDM symbols in each slot. A non-limiting embodiment is shown in FIG. 8. This embodiment is appropriate for standalone deployment without NRS muting, since the mapping need not be concerned about the legacy PDCCH region and LTE CRS. Since NRS is not muted, this embodiment avoids mapping NPRS symbols to the OFDM symbols that may be used by NRS.

Figure 9:
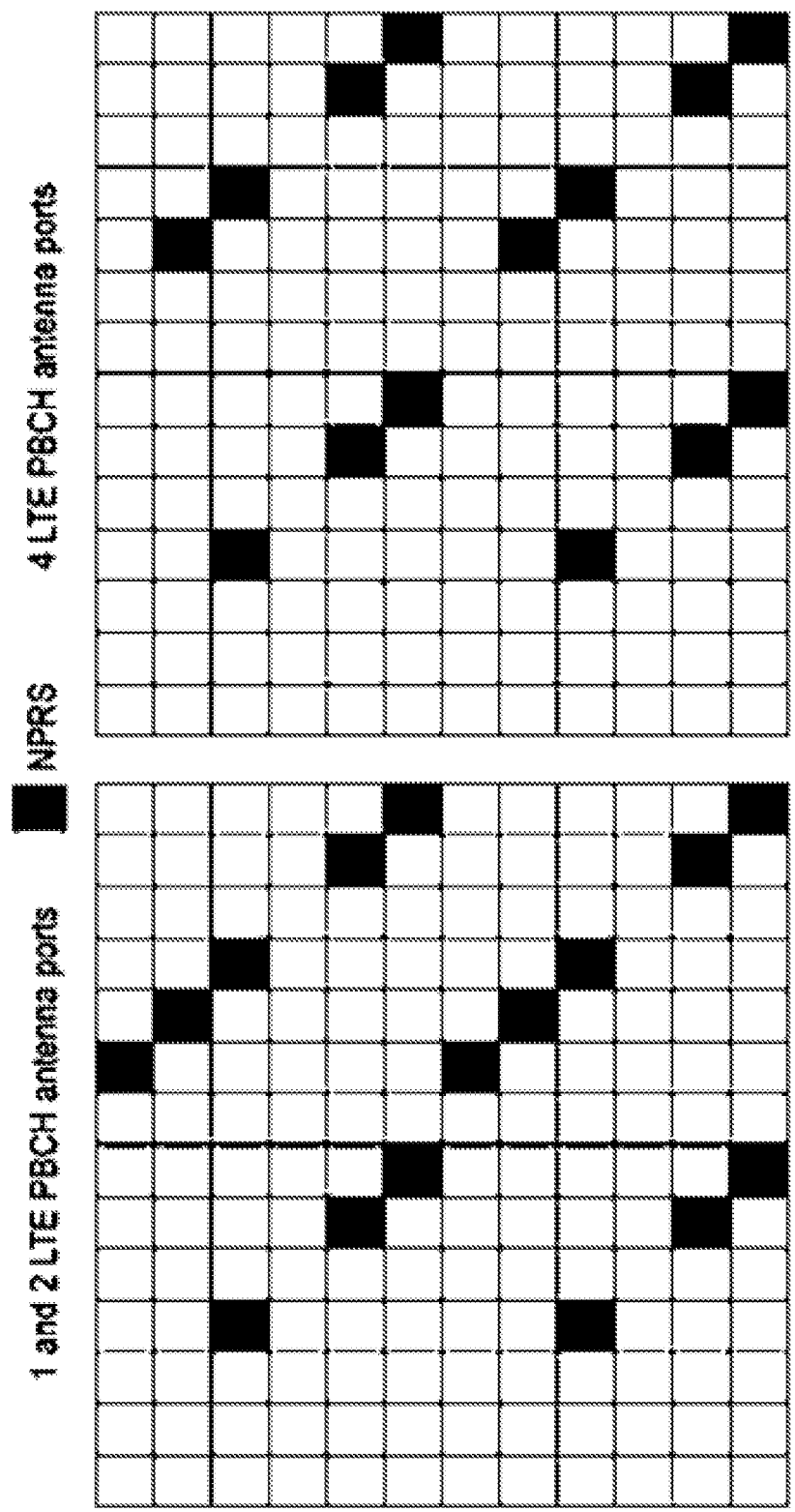
FIG. 9 is a block diagram of a mapping pattern for narrowband PRS according to still other embodiments.

In embodiment 3.3, NPRS symbols are mapped to all OFDM symbols in a diagonal way, as in the mapping of PRS. A non-limiting embodiment is shown in FIG. 9. This embodiment is appropriate for inband deployment with NRS muting, since this case is concerned about legacy PDCCH region and LTE CRS.

Figure 10:
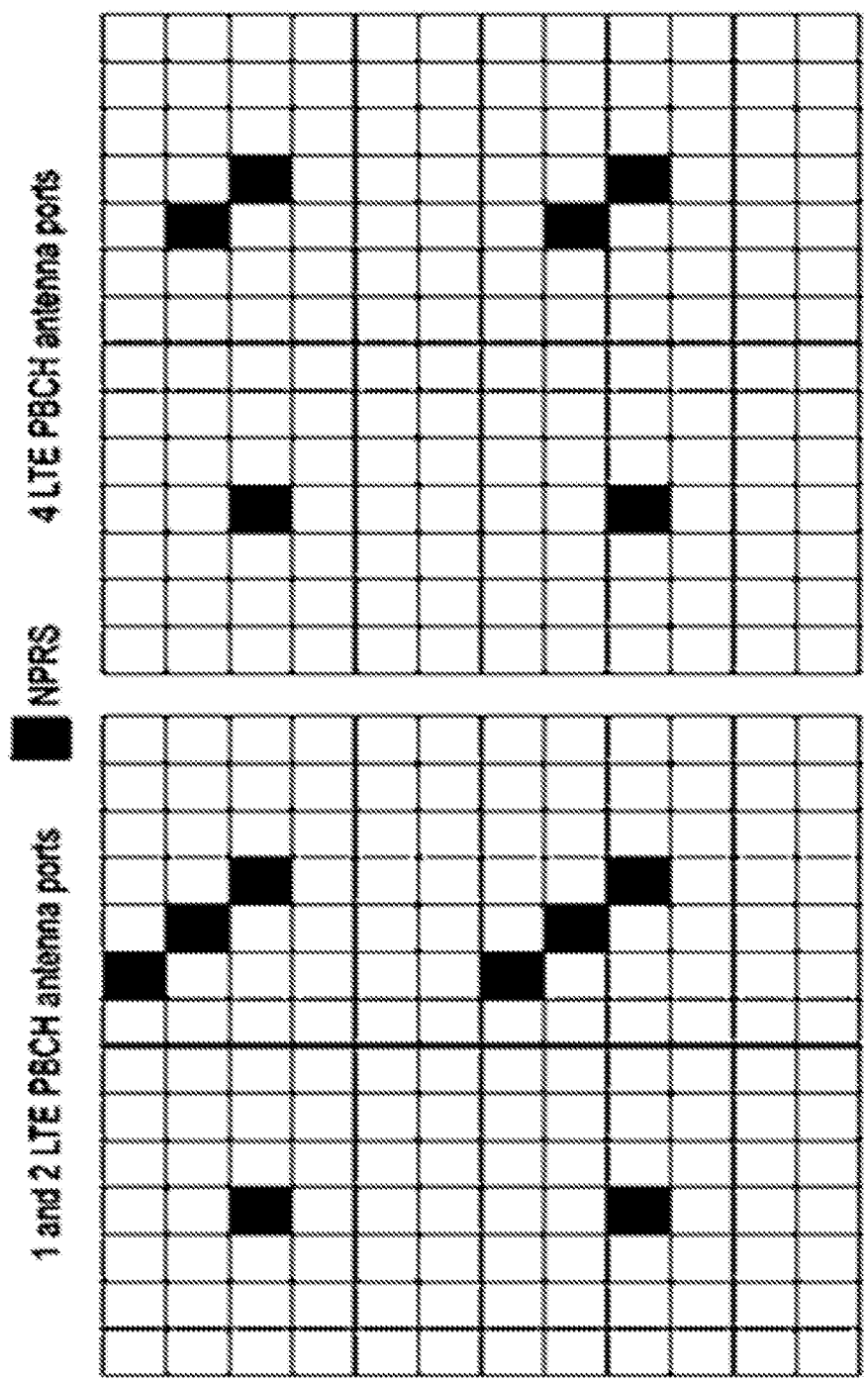
FIG. 10 is a block diagram of a mapping pattern for narrowband PRS according to yet other embodiments.

In embodiment 3.4, NPRS symbols are mapped to all OFDM symbols in a diagonal way, as in the mapping of PRS. But NPRS symbols are not mapped to the last two OFDM symbols in each slot. A non-limiting embodiment is shown in FIG. 10. This embodiment is appropriate for inband deployment without NRS muting, since this case is concerned about legacy PDCCH region and LTE CRS. Since NRS is not muted, the embodiment avoids mapping NPRS symbols to the OFDM symbols that may be used by NRS.

For guardband deployment, either embodiment 3.1, 3.2, 3.3, or 3.4 can be used.

Note that in FIGS. 7-10 one example shift in frequency domain is shown. The shift in the mapping is a function of NB-IoT cell ID. A non-limiting example is $v_{shift}=N_{ID}^{cell}$ mod 6 which yields a total of 6 possible shifts.

Figure 11:
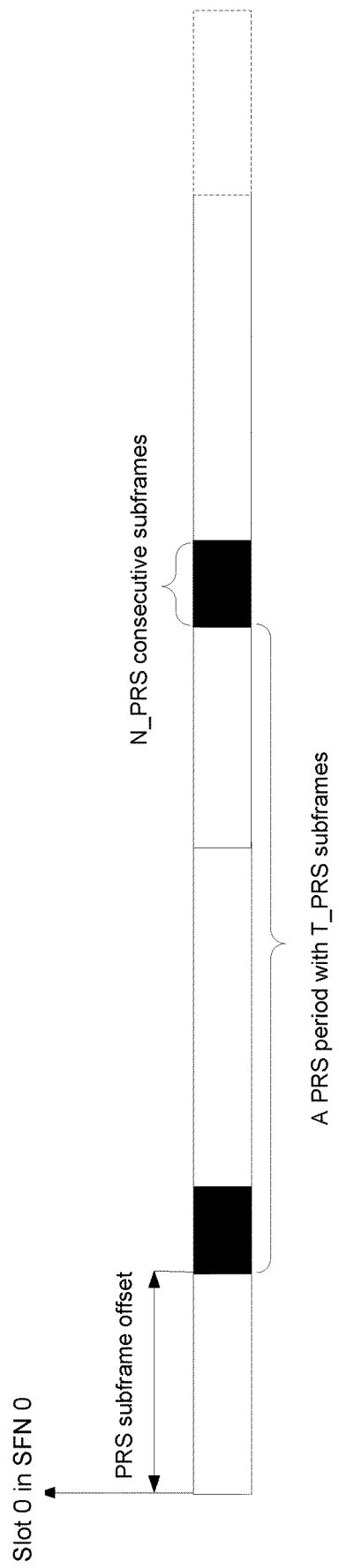
FIG. 11 is a block diagram of an LTE PRS configuration in the time domain.

The legacy LTE PRS configuration in time domain jointly/separately specifies three parameters: (i) PRS period which is a value in the set {160, 320, 640, 1280} subframes; (ii) PRS subframe offset which is any value between 0 and P−1 subframes for a PRS period with P subframes; and (iii) Number of consecutive subframes which is a value in the set {1, 2, 4, 6} subframes. FIG. 11 in this regard gives an illustration of LTE PRS configuration in the time domain.

For NPRS with only 1 PRB, it is beneficial to allow denser NPRS configuration in the time domain. Indeed, compared to NSSS that is mapped to the last 11 symbols in a subframe, PRS is ~4.7 times sparser. Accordingly, without power boosting of PRS, it requires ~4.7 more subframes for PRS than NSSS to accumulate the same signal energy. Though further PRS power boosting may be difficult for already power boosted NB-IoT anchor carrier in inband deployment. PRS power boosting is possible for standalone (and possibly guardband). With 3 dB PRS power boosting, only ~2.36 times more subframes are needed for PRS than NSSS to accumulate the same signal energy. With 6 dB PRS power boosting, only ~1.18 times more subframes are needed for PRS than NSSS to accumulate the same signal energy. Further, to enhance NB-IoT OTDOA support for extended coverage, some embodiments employ denser PRS configuration than existing LTE PRS by specifying smaller PRS periods and/or larger numbers of consecutive PRS subframes in a PRS occasion.

Accordingly, in embodiment 4.1, the values for NPRS period and/or the number of consecutive subframes for NPRS are extended from the legacy values to a larger set. A non-limiting embodiment is that the NPRS period may be in the set {10, 20, 40, 80, 160, 320, 640, 1280} subframes. Alternatively or additionally, a non-limiting embodiment is that the number of consecutive NPRS subframes may be in the set {1, 2, 4, 6, 8, 10, 16, 32, 64, 128} subframes.

Figure 12:
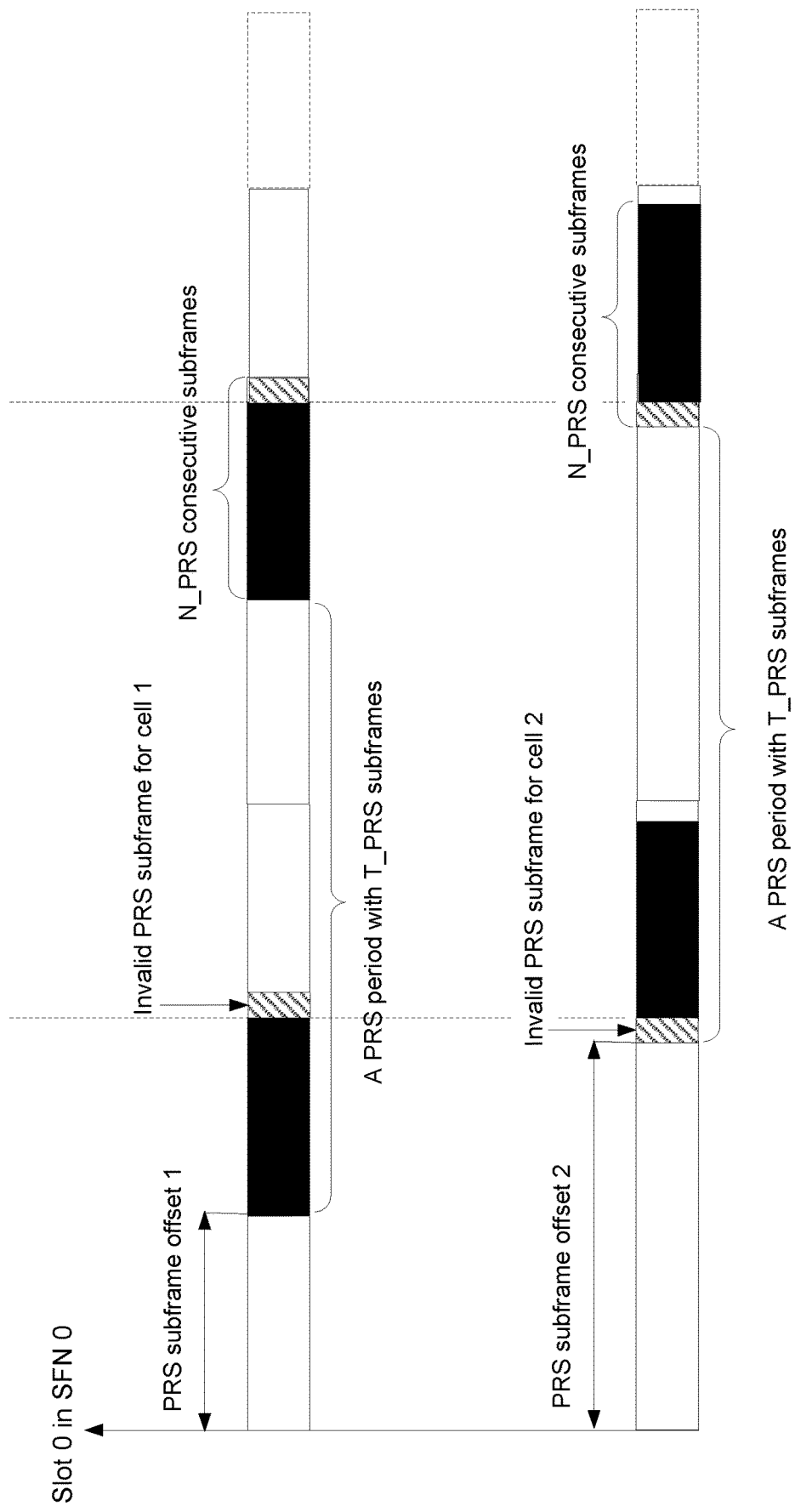
FIG. 12 is a block diagram of muting of narrowband PRS according to some embodiments.

To enable further coordination flexibility across cells, the network can mute NPRS in any or a subset of these subframes by indicating the subframes as invalid NPRS subframes. This is illustrated in FIG. 12, where there are two cells with overlapping NPRS subframes. Each cell may indicate a portion of the configured consecutive subframes invalid to avoid the overlapping.

In embodiment 4.2, for the configured consecutive NPRS subframes, the network may mute NPRS in any or a subset of these subframes by indicating the subframes as invalid NPRS subframes. The invalid NPRS subframe configuration in some embodiments is signaled to the UE via system information, or RRC signaling, or communication packets in positioning protocol such as LPP, or a combination of any of the previous methods.

The following parallel embodiment applies to FeMTC. For FeMTC, it may also be beneficial to consider denser PRS configuration in the time domain, motivating the following embodiment. In embodiment 4.3, the values for PRS period and/or the number of consecutive PRS subframes for FeMTC OTDOA are extended from the legacy values to a larger set. A non-limiting embodiment is that the PRS period may be in the set {10, 20, 40, 80, 160, 320, 640, 1280} subframes. Alternatively or additionally, a non-limiting embodiment is that the number of consecutive PRS subframes may be in the set {1, 2, 4, 6, 8, 10, 16, 32, 64, 128} subframes. In other embodiments, the PRS period and/or the number of consecutive PRS subframes for NPRS and/or FeMTC may include all, some, or none of the legacy values.

Consider now some embodiments that employ antenna diversity. LTE PRS is transmitted on antenna port 6 (see 3GPP TS 36.211 V13.2.0 Section 6.10.4). No explicit transmission scheme is defined when there are more than 1 transmit antennas. Embodiments herein design explicit antenna transmission scheme(s) for NB-IoT where eNB may have 2 transmit antennas.

In embodiment 5.1, a 2 by 2 precoder $$W = \begin{bmatrix} w_{11} & w_{12} \\ w_{21} & w_{22} \end{bmatrix}$$

is applied to NPRS transmissions every M+N subframes used by NPRS. The M+N subframes may or may not be consecutive. The first row of W applies to the first M subframes, and the second row of W applies to the last N subframes.

As a non-limiting example, M and N may both be equal to 1. As a non-limiting example, $$W = \begin{bmatrix} 1 & 0 \\ 0 & 1 \end{bmatrix}.$$

In other words, for the first M subframes, NPRS is transmitted on antenna 1; for the last N subframes, NPRS is transmitted on antenna 2.

As another non-limiting example, $$W = \begin{bmatrix} 1 & 1 \\ 1 & -1 \end{bmatrix}.$$

In other words, for the first M subframes, NPRS is transmitted on both antenna 1 and antenna 2; for the last N subframes, NPRS is transmitted on both antenna 1 and antenna 2, with the symbols on antenna 2 being the negative of the symbols on antenna 1.

As yet another non-limiting example, $$W = \begin{bmatrix} 1 & 1 \\ 1 & 1 \end{bmatrix}.$$

In other words, NPRS is transmitted on both antenna 1 and antenna 2 for all the M+N subframes.

The following parallel embodiment applies to FeMTC. In embodiment 5.2, a precoder W is applied to PRS transmissions for FeMTC OTDOA. As a non-limiting example, the precoder may be of 2 by 2 demission as in Embodiment 5.1. As another non-limiting example, the precoder may be of 4 by 4 dimension Some embodiments are described from on the one hand the perspective of a transmission point, generating the NPRS based on a configuration, and on the other hand the perspective of a device, detecting the NPRS based on a configuration and estimating the time of arrival.

Figure 13:
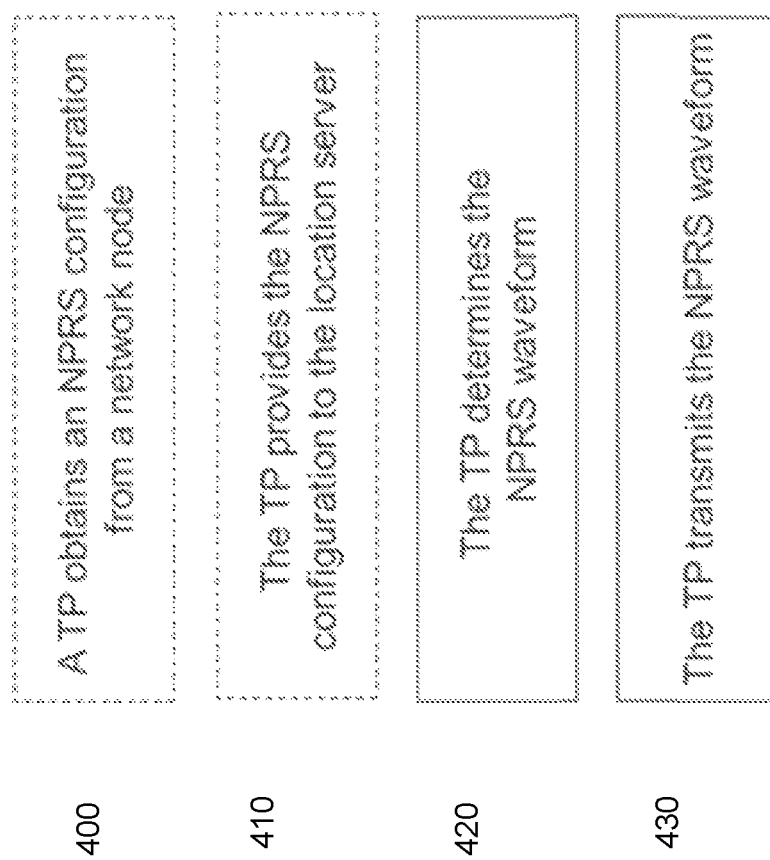
FIG. 13 is a logic flow diagram of a method performed by a transmission point according to some embodiments.

FIG. 13 illustrates steps of some embodiments from a transmission point perspective. A transmission point (TP) optionally receives (400) from a network node (e.g. the operations, administration, and maintenance, OAM, system) a configuration of an NPRS as detailed in some embodiments. The transmission point may also send (410) the NPRS configuration to a network node such as the location server. The transmission point determines (420) the NPRS (waveform) based on the NPRS configuration (420), and transmits (430) the NPRS.

Figure 14:
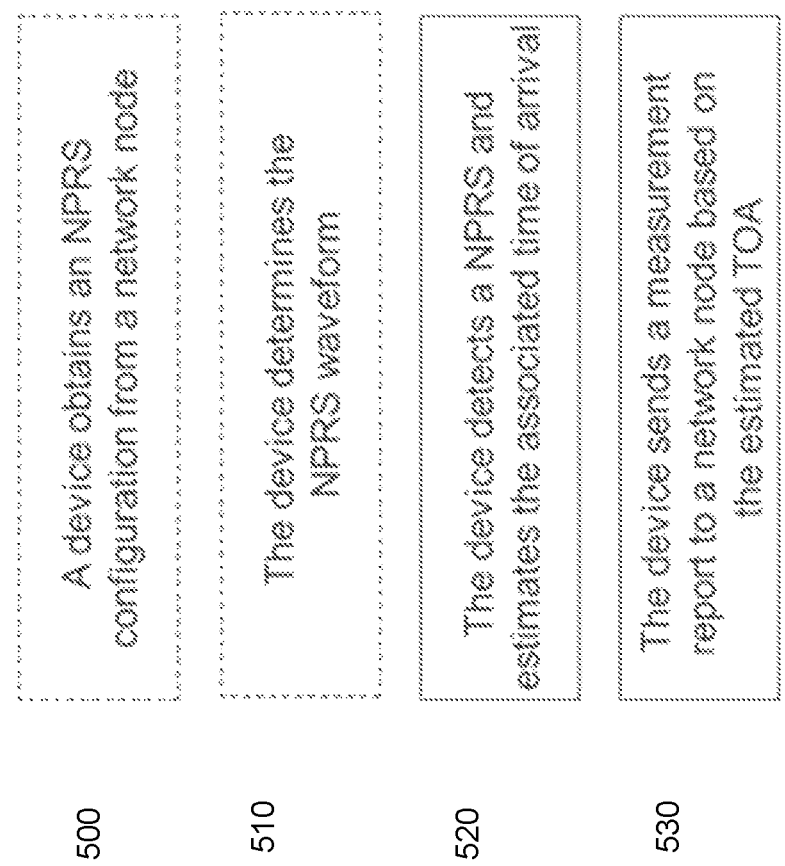
FIG. 14 is a logic flow diagram of a method performed by a wireless communication device according to some embodiments.

FIG. 14 provides steps of some embodiments from a device perspective. The device optionally obtains (or retrieves from a pre-configuration) (500) an NPRS configuration as detailed in some embodiments. The device may as a separate step determine (510) the NPRS waveform. The device detects the NPRS and estimates its time of arrival (TOA) based on the NPRS configuration (520). Then, the device sends a measurement report to a network node (e.g. the location server) based on the estimated TOA (530).

Some embodiments herein are advantageous in that they provide full inheritance of advantages of existing PRS design, reducing design risks and testing efforts. The NPRS design is built on existing PRS design and thus existing PRS configuration mechanism is reused or adapted for NB-IoT in some embodiments. As a result, NPRS signals from different cells can be separated in frequency domain (e.g., via frequency reuse of 6), in time domain (e.g., with muting), and code domain (e.g., with different cells using different sequences), leading to enhanced hearability of NPRS signals from multiple cells. Indeed, the 6 reuse alone allows 70% of all connections to be above −15 dB SINR for 10 strongest eNBs in a reuse 1 network, showing a significant 30% improvement compared to the case without reuse 6 PRS pattern. If in addition applying time domain muting further improvements are within reach.

Other advantages of some embodiments include a unified design for standalone, inband, and guardband: The NPRS design is a unified design applicable to all NB-IoT deployment modes including standalone, inband, and guardband deployments.

Some embodiments may be advantageous in that they provide potential synergy with other LTE PRSs. The NPRS design maintains synergy with other LTE PRSs, making it possible to use the same cell planning/resource element mapping/sequence generation for NB-IoT and LTE networks. This may also help improve radio resource utilization, e.g., LTE UE may combine NPRS and PRS in non-NB-IoT physical resource blocks (PRBs) for RSTD measurements, reducing the overall PRS overhead.

Some embodiments may be advantageous in that they provide maximal diversity and timing resolution: The NPRS resource element mapping spans over time and frequency in a maximal way, leading to maximally possible diversity and timing resolution in 1 subframe over 1 PRB.

Some embodiments may be advantageous in that they provide antenna diversity: The newly introduced optional antenna diversity in NPRS help further improve RSTD measurements accuracy.

Many designs advantageously apply to FeMTC.

Some examples herein are presented in the context of an LTE system and either an NB-IoT system or an FeMTC system, but they are applicable to any type of systems.

Note that a radio node herein is any type of node (e.g., a radio network node or wireless device) capable of communicating with another node over radio signals. A radio network node is any type of radio node within a wireless communication network, such as a base station. A network node is any type of node within a wireless communication network, whether a radio network node or not. A wireless communication device is any type of radio node capable of communicating with a radio network node over radio signals. A wireless communication device may therefore refer to a user equipment (UE), a machine-to-machine (M2M) device, a machine-type communications (MTC) device, a NB-IoT device, etc. However it should be noted that the UE does not necessarily have a "user" in the sense of an individual person owning and/or operating the device. A wireless communication device may also be referred to as a radio device, a radio communication device, a wireless terminal, wireless device, or simply a terminal unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an internet of things (IoT) or MTC scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that a radio network node 18 as described above may perform the method in FIG. 2A, FIG. 13 and/or any other processing herein by implementing any functional means or units. In one embodiment, for example, the radio network node 18 comprises respective circuits or circuitry configured to perform the steps shown in FIG. 2A and/or FIG. 13. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 15:
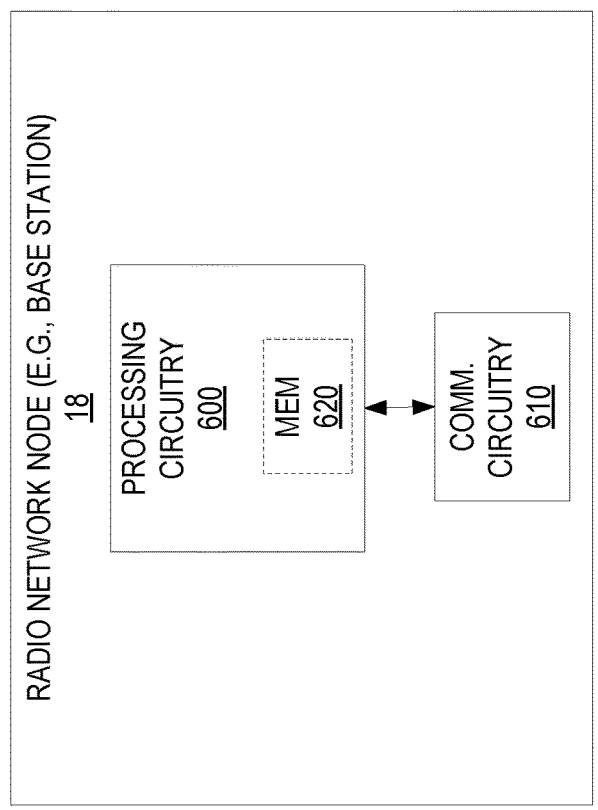
FIG. 15 is a block diagram of a radio network node according to some embodiments.

FIG. 15 illustrates a radio network node 18 implemented in accordance with one or more embodiments. As shown, the radio network node 18 includes processing circuitry 600 and communication circuitry 610. The communication circuitry 610 is configured to transmit and/or receive information to and/or from one or more other nodes, e.g., via any communication technology. Such communication may occur via one or more antennas that are either internal or external to the radio network node 18. The processing circuitry 600 is configured to perform processing described above, e.g., in FIG. 2A and/or FIG. 13, such as by executing instructions stored in memory 620. The processing circuitry 600 in this regard may implement certain functional means, units, or modules.

Figure 16:
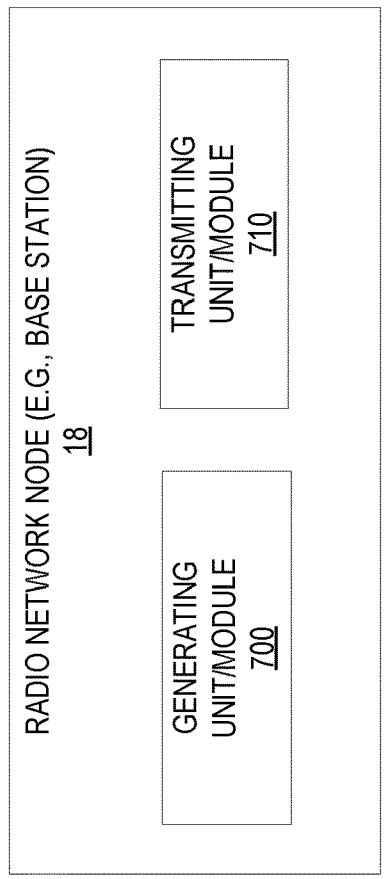
FIG. 16 is a block diagram of a radio network node according to other embodiments.

FIG. 16 illustrates a radio network node 18 implemented in accordance with one or more other embodiments. As shown, the radio network node 18 implements various functional means, units, or modules, e.g., via the processing circuitry 600 in FIG. 15 and/or via software code. These functional means, units, or modules, e.g., for implementing the method in FIG. 2A, include for instance a generating unit or module 700 for generating a narrowband positioning reference signal that comprises a narrowband reference signal sequence, wherein the narrowband reference signal sequence is a subsequence of a wideband reference signal sequence, wherein the wideband reference signal sequence is configured for a wideband frequency bandwidth that is wider than a maximum frequency bandwidth defined for the narrowband wireless communication system. Also included is a transmitting unit or module 710 for transmitting the narrowband positioning reference signal to a wireless communication device, e.g., for performance of a positioning measurement.

Also note that a wireless communication device 16 (e.g., UE) as described above may perform the method in FIG. 2B and any other processing herein by implementing any functional means or units. In one embodiment, for example, the wireless communication device 16 comprises respective circuits or circuitry configured to perform the steps shown in FIG. 2B. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 17:
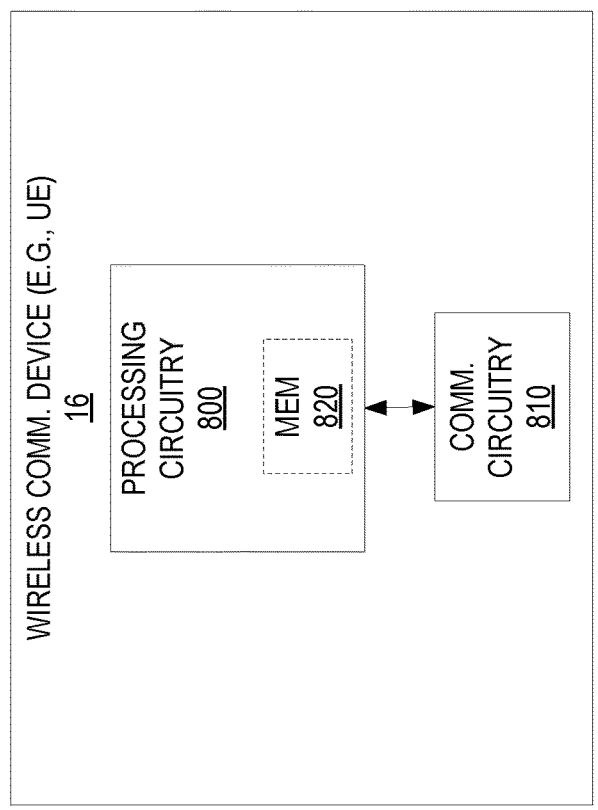
FIG. 17 is a block diagram of a wireless communication device according to some embodiments.

FIG. 17 illustrates a wireless communication device 13 implemented in accordance with one or more embodiments. As shown, the wireless communication device 13 includes processing circuitry 800 and communication circuitry 810. The communication circuitry 810 is configured to transmit and/or receive information to and/or from one or more other nodes, e.g., via any communication technology. Such communication may occur via one or more antennas that are either internal or external to the wireless communication device 16. The processing circuitry 800 is configured to perform processing described above, e.g., in FIG. 2B, such as by executing instructions stored in memory 820. The processing circuitry 800 in this regard may implement certain functional means, units, or modules.

Figure 18:
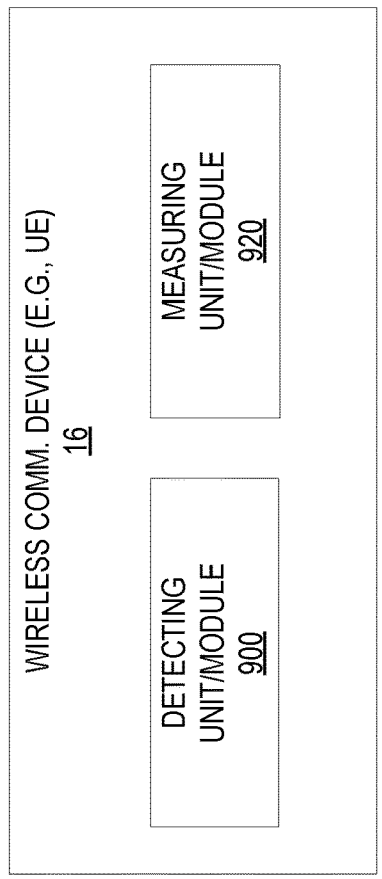
FIG. 18 is a block diagram of a wireless communication device according to other embodiments.

FIG. 18 illustrates a wireless communication device 16 implemented in accordance with one or more other embodiments. As shown, the wireless communication device 16 implements various functional means, units, or modules, e.g., via the processing circuitry 800 in FIG. 17 and/or via software code. These functional means, units, or modules, e.g., for implementing the method in FIG. 2B, include for instance a detecting unit or module 900 for detecting receipt of a narrowband positioning reference signal that comprises a narrowband reference signal sequence, wherein the narrowband reference signal sequence is a subsequence of a wideband reference signal sequence, wherein the wideband reference signal sequence is configured for a wideband frequency bandwidth that is wider than a maximum frequency bandwidth defined for the narrowband wireless communication system. Also included is a measuring unit or module 920 for performing a positioning measurement using the narrowband positioning reference signal.

Further note that a network node 22 as described above may perform the method in FIG. 3 and/or any other processing herein by implementing any functional means or units. In one embodiment, for example, the network node 22 comprises respective circuits or circuitry configured to perform the steps shown in FIG. 3. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 19:
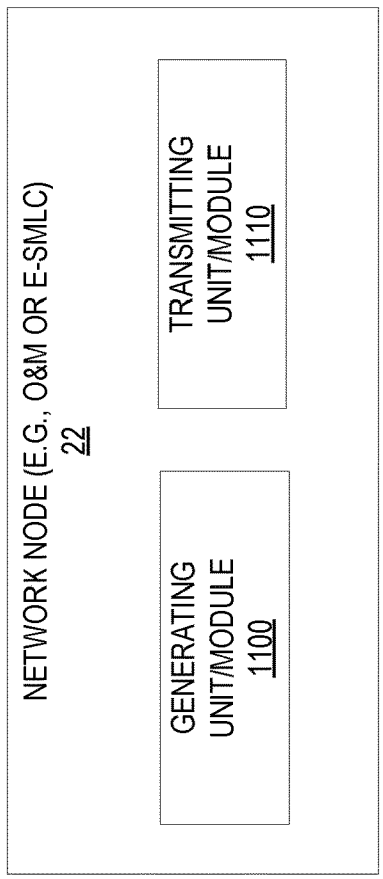
FIG. 19 is a block diagram of a network node according to some embodiments.

FIG. 19 illustrates a network node 22 implemented in accordance with one or more embodiments. As shown, the network node 22 includes processing circuitry 1000 and communication circuitry 1010. The communication circuitry 1010 is configured to transmit and/or receive information to and/or from one or more other nodes, e.g., via any communication technology. Such communication may occur via one or more antennas that are either internal or external to the network node 22. The processing circuitry 1000 is configured to perform processing described above, e.g., in FIG. 3, such as by executing instructions stored in memory 1020. The processing circuitry 1000 in this regard may implement certain functional means, units, or modules.

Figure 20:
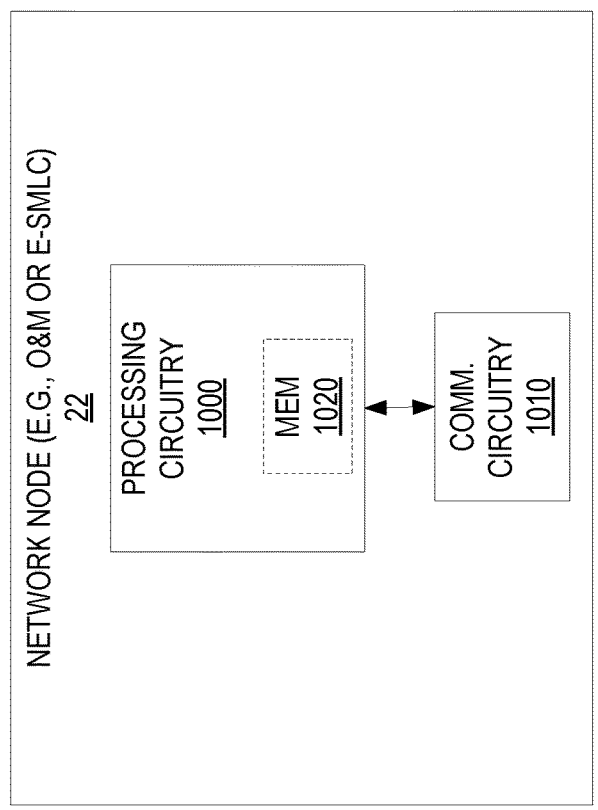
FIG. 20 is a block diagram of a network node according to other embodiments.

FIG. 20 illustrates a network node 22 implemented in accordance with one or more other embodiments. As shown, the network node 22 implements various functional means, units, or modules, e.g., via the processing circuitry 1000 in FIG. 19 and/or via software code. These functional means, units, or modules, e.g., for implementing the method in FIG. 3, include for instance a generating unit or module 1100 for generating configuration information for configuring a radio network node to transmit and/or a wireless communication device to detect a narrowband positioning reference signal that comprises a narrowband reference signal sequence, wherein the narrowband reference signal sequence is a subsequence of a wideband reference signal sequence, wherein the wideband reference signal sequence is configured for a wideband frequency bandwidth that is wider than a maximum frequency bandwidth defined for the narrowband wireless communication system. Also included is a transmitting unit or module 1110 for transmitting the configuring information to the radio network node and/or the wireless communication device, e.g., as part of configuring performance of a positioning measurement using the narrowband positioning reference signal.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The invention claimed is:

1. A method performed by a user equipment configured for operation in a narrowband wireless communication system, the method comprising the user equipment:

detecting receipt of a narrowband positioning reference signal that comprises a narrowband reference signal sequence;

wherein the narrowband reference signal sequence is a subsequence of a wideband reference signal sequence;

wherein the wideband reference signal sequence is configured for a wideband frequency bandwidth that is wider than a maximum frequency bandwidth defined for the narrowband wireless communication system;

wherein the narrowband reference signal sequence is a subsequence at a position within the wideband reference signal sequence that depends on a relative position of the narrowband wireless communication system within a system bandwidth of a wideband wireless communication system for which the wideband reference signal is configured;

wherein the narrowband reference signal sequence is mapped to radio resources within a narrowband frequency bandwidth comprising $N_{RB}^{NPRS}$ resource blocks, with $E_{NB}$ elements from the narrowband reference signal sequence mapped to $E_{NB}$ radio resources within each resource block;

wherein the wideband reference signal sequence includes more than $E_{NB} \cdot N_{RB}^{max,NB}$ elements, where $N_{RB}^{max,NB} \geq N_{RB}^{NPRS}$ comprises a number of resource blocks that span the maximum frequency bandwidth defined for the narrowband wireless communication system; and performing a positioning measurement using the narrowband positioning reference signal.

2. The method of claim 1, wherein $N_{RB}^{max,NB} = N_{RB}^{NPRS} = 1$ and $E_{NB} = 2$.

3. The method of claim 1, wherein the narrowband reference signal sequence is mapped to frequency resources within a symbol l and time slot $n_s$, and is a subsequence of the wideband reference signal sequence $r_{l,n_s}(m)$ defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

where $n_s$ is a slot number within a radio frame, l is a symbol number within the slot, c(i) is a pseudo-random sequence, and $N_{RB}^{max,DL}$ is a number of resource blocks within the wideband frequency bandwidth for which the wideband reference signal sequence is configured.

4. The method of claim 3, wherein the pseudo-random sequence c(i) is initialized with a cell identity $N_{ID}^{Ncell}$ of a cell of the narrowband wireless communication system in which the narrowband positioning reference signal is transmitted.

5. The method of claim 1:
wherein the narrowband reference signal sequence comprises $2 \cdot N_{RB}^{NPRS}$ elements at a center of the wideband reference signal sequence; and
wherein the narrowband positioning reference signal is transmitted within a narrowband frequency bandwidth comprising $N_{RB}^{NPRS}$ resource blocks.

6. The method of claim 1, wherein configuration information transmitted from a network node indicates that the narrowband reference signal sequence is a particular one of different possible subsequences of the wideband reference signal sequence.

7. The method of claim 1, wherein the narrowband reference signal sequence is mapped onto radio resources in each symbol interval of a time slot.

8. The method of claim 1, wherein one or more narrowband positioning reference signals are transmitted within a positioning occasion that comprises a defined number of consecutive subframes, wherein the defined number is more than six.

9. A user equipment configured for operation in a narrowband wireless communication system, the user equipment comprising:
processing circuitry; and
memory containing instructions executable by the processing circuitry whereby the user equipment is configured to:
detect receipt of a narrowband positioning reference signal that comprises a narrowband reference signal sequence;
wherein the narrowband reference signal sequence is a subsequence of a wideband reference signal sequence;
wherein the wideband reference signal sequence is configured for a wideband frequency bandwidth that is wider than a maximum frequency bandwidth defined for the narrowband wireless communication system;
wherein the narrowband reference signal sequence is a subsequence at a position within the wideband reference signal sequence that depends on a relative position of the narrowband wireless communication system within a system bandwidth of a wideband wireless communication system for which the wideband reference signal is configured;
wherein the narrowband reference signal sequence is mapped to radio resources within a narrowband frequency bandwidth comprising $N_{RB}^{NPRS}$ resource blocks, with $E_{NB}$ elements from the narrowband reference signal sequence mapped to $E_{NB}$ radio resources within each resource block;
wherein the wideband reference signal sequence includes more than $E_{NB} \cdot N_{RB}^{max,NB}$ elements, where $N_{RB}^{max,NB} \geq N_{RB}^{NPRS}$ comprises a number of resource blocks that span the maximum frequency bandwidth defined for the narrowband wireless communication system; and
perform a positioning measurement using the narrowband positioning reference signal.

10. A non-transitory computer readable recording medium storing a computer program product for controlling a user equipment configured for operation in a narrowband wireless communication system, the computer program product comprising software instructions which, when run on processing circuitry of the user equipment, causes the to:
detect receipt of a narrowband positioning reference signal that comprises a narrowband reference signal sequence; wherein the narrowband reference signal sequence is a subsequence of a wideband reference signal sequence; wherein the wideband reference signal sequence is configured for a wideband frequency bandwidth that is wider than a maximum frequency bandwidth defined for the narrowband wireless communication system; wherein the narrowband reference signal sequence is a subsequence at a position within the wideband reference signal sequence that depends on a relative position of the narrowband wireless communication system within a system bandwidth of a wideband wireless communication system for which the wideband reference signal is configured;

wherein the narrowband reference signal sequence is mapped to radio resources within a narrowband frequency bandwidth comprising $N_{RB}^{NPRS}$ resource blocks, with $E_{NB}$ elements from the narrowband reference signal sequence mapped to $E_{NB}$ radio resources within each resource block;

wherein the wideband reference signal sequence includes more than $E_{NB} \cdot N_{RB}^{max,NB}$ elements, where $N_{RB}^{max,NB} \geq N_{RB}^{NPRS}$ comprises a number of resource blocks that span the maximum frequency bandwidth defined for the narrowband wireless communication system; and perform a positioning measurement using the narrowband positioning reference signal.

\* \* \* \* \*